US011627226B2

(12) United States Patent
Tashiro

(10) Patent No.: US 11,627,226 B2
(45) Date of Patent: Apr. 11, 2023

(54) IMAGE PROCESSING APPARATUS, CONTROL METHOD, AND PRODUCT FOR DETERMINING DEFECT REPRODUCIBILITY BASED ON DEFECT POSITIONS ON RECORDING MEDIA CALCULATED FROM PHASE INFORMATION

(71) Applicant: CANON KABUSHIKI KAISHA, Tokyo (JP)

(72) Inventor: Hideyasu Tashiro, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/713,757

(22) Filed: Apr. 5, 2022

(65) Prior Publication Data
US 2022/0329700 A1 Oct. 13, 2022

(30) Foreign Application Priority Data

Apr. 9, 2021 (JP) .............................. JP2021-066715

(51) Int. Cl.
*H04N 1/00* (2006.01)
*H04N 1/387* (2006.01)
(Continued)

(52) U.S. Cl.
CPC ..... *H04N 1/00015* (2013.01); *H04N 1/00005* (2013.01); *H04N 1/00034* (2013.01);
(Continued)

(58) Field of Classification Search
CPC ........... H04N 1/00005; H04N 1/00015; H04N 1/00034; H04N 1/00068; H04N 1/00076;
(Continued)

(56) References Cited

U.S. PATENT DOCUMENTS 5,365,310 A 11/1994 Jenkins
6,070,041 A * 5/2000 Nakayasu .......... G03G 15/5008
399/167

(Continued)

FOREIGN PATENT DOCUMENTS

JP 3576209 B2 10/2004

*Primary Examiner* — Scott A Rogers
(74) *Attorney, Agent, or Firm* — Canon U.S.A., Inc. IP Division

(57) ABSTRACT

This disclosure provides an image processing apparatus that is connected to a printing apparatus, sequentially receives a plurality of recording media on which printing was performed by the printing apparatus, and inspects a quality of images formed on the recording media, wherein the image processing apparatus receives a reference image, acquires a plurality of scanned images by sequentially scanning the recording media output from the printing apparatus and having the images to be inspected recorded thereon, receives phase information of an image bearing member of the printing apparatus, detects, for each of the scanned images, a defect on the scanned image by comparing a pixel value of the reference image and a pixel value of the scanned image, and determines whether a defect has reproducibility based on positions of defects on the recording media calculated from the phase information.

8 Claims, 28 Drawing Sheets

(51) Int. Cl.
  *H04N 1/29* (2006.01)
  *H04N 1/40* (2006.01)
(52) U.S. Cl.
  CPC ..... *H04N 1/00068* (2013.01); *H04N 1/00084* (2013.01); *H04N 1/29* (2013.01); *H04N 1/3872* (2013.01); *H04N 1/00076* (2013.01); *H04N 1/40006* (2013.01)
(58) Field of Classification Search
  CPC .... H04N 1/00084; H04N 1/29; H04N 1/3872; H04N 1/40006
  See application file for complete search history.

(56) References Cited

U.S. PATENT DOCUMENTS

| | | | | |
|---|---|---|---|---|
| 9,158,256 | B2* | 10/2015 | Takahashi | G03G 15/5041 |
| 9,571,670 | B2* | 2/2017 | Ooyanagi | H04N 1/00005 |
| 9,645,521 | B2* | 5/2017 | Kodama | H04N 1/6091 |
| 2020/0013158 | A1* | 1/2020 | Asai | G06T 7/0002 |

\* cited by examiner

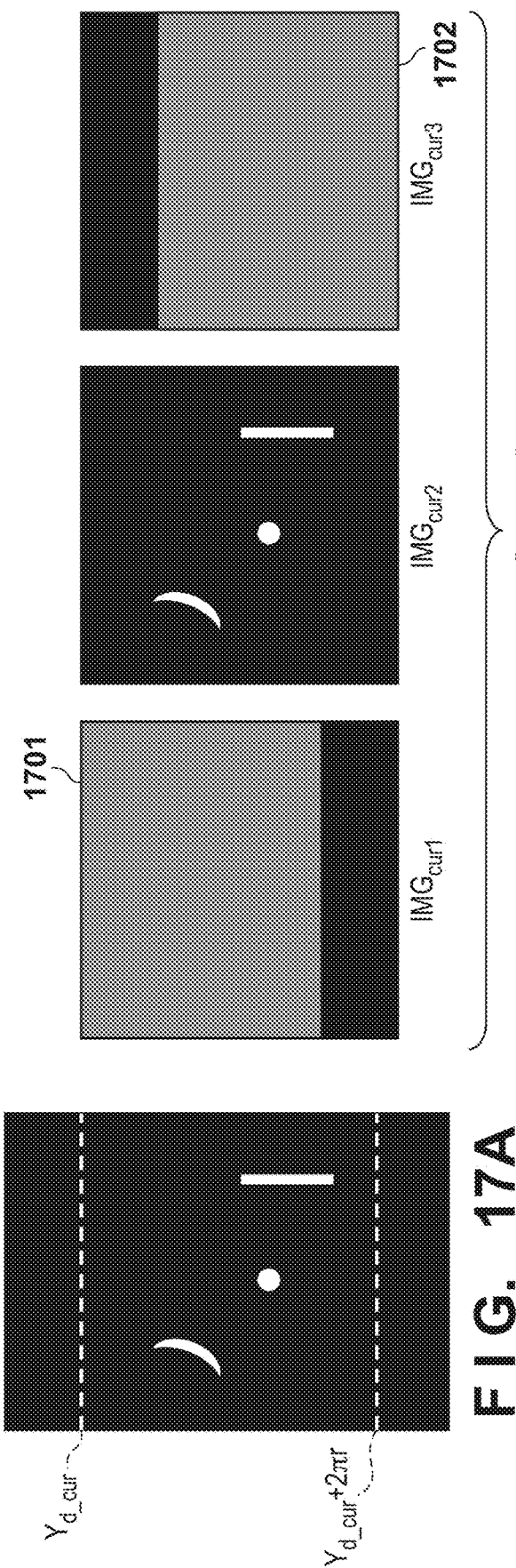

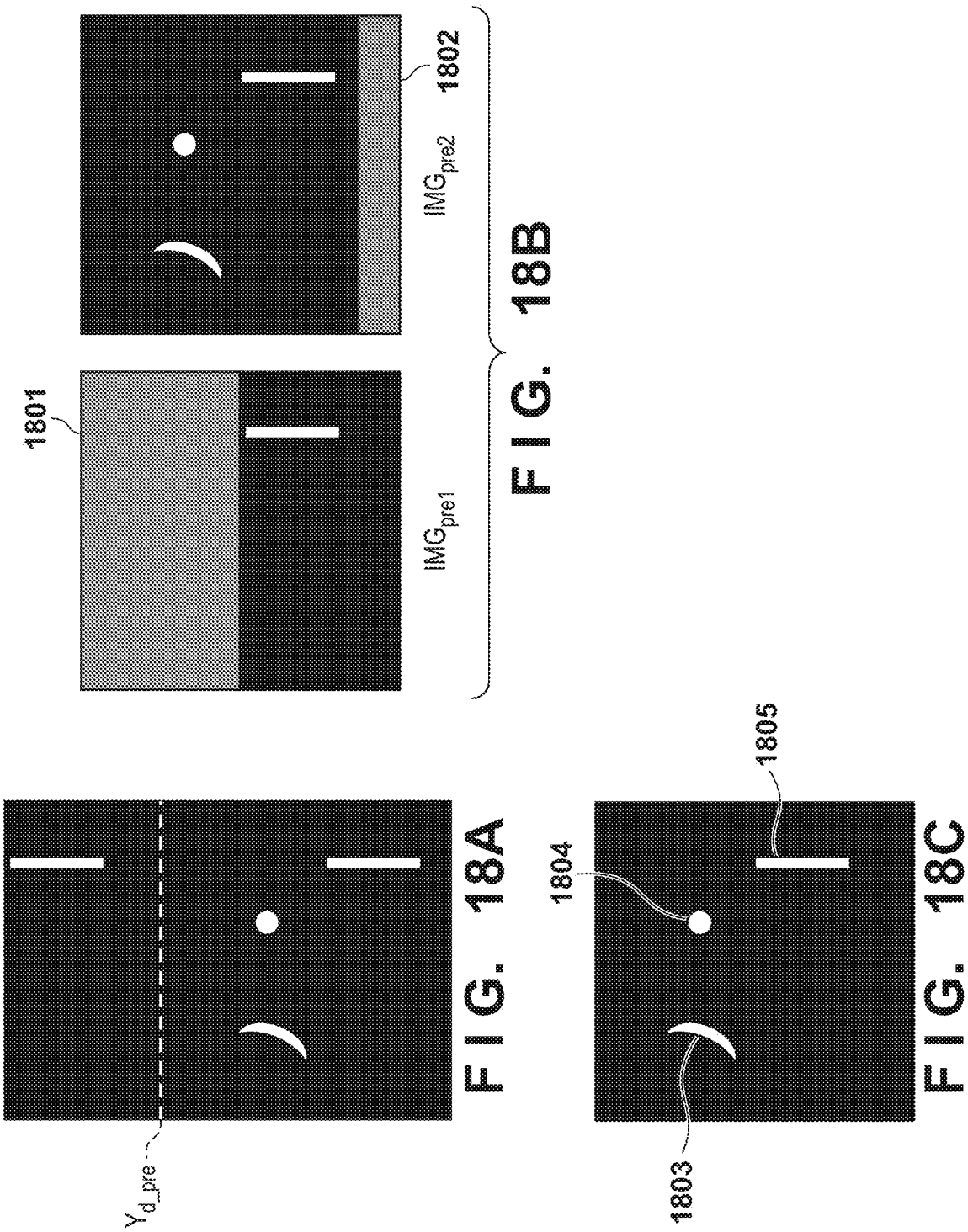

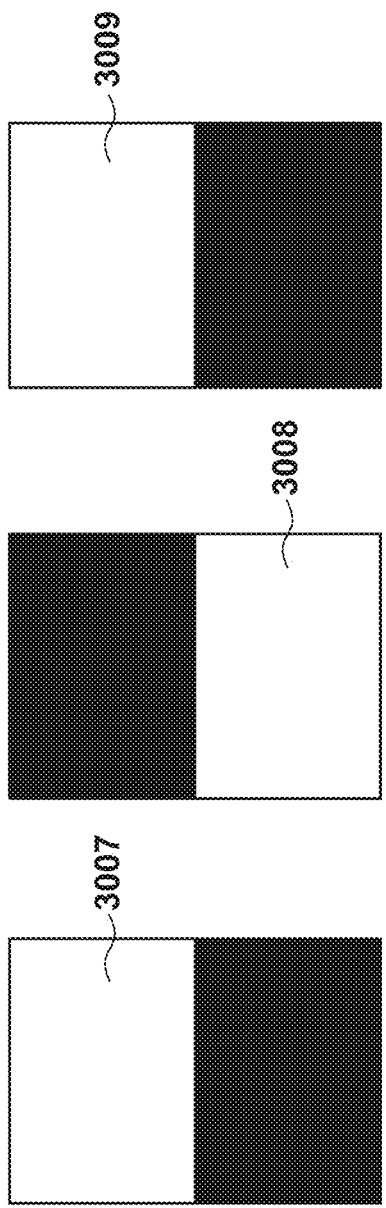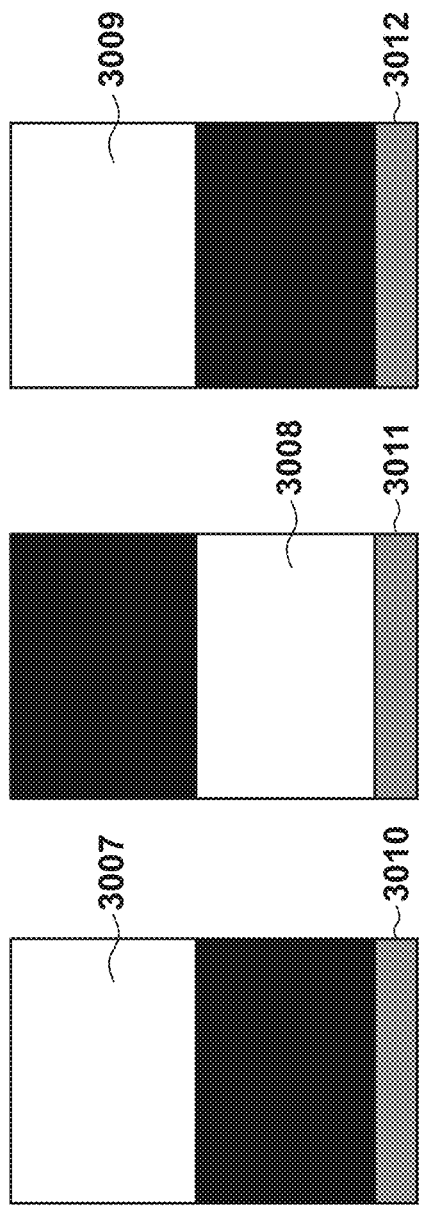

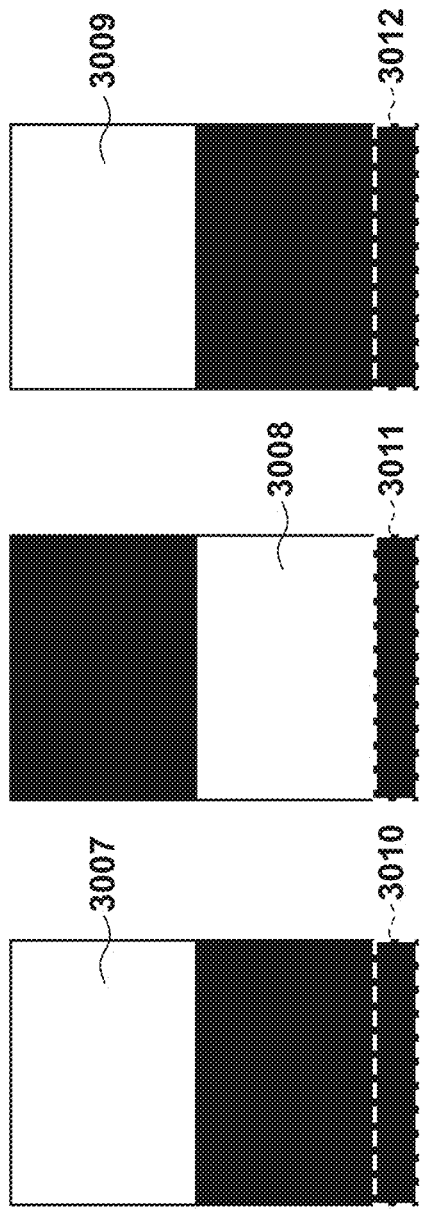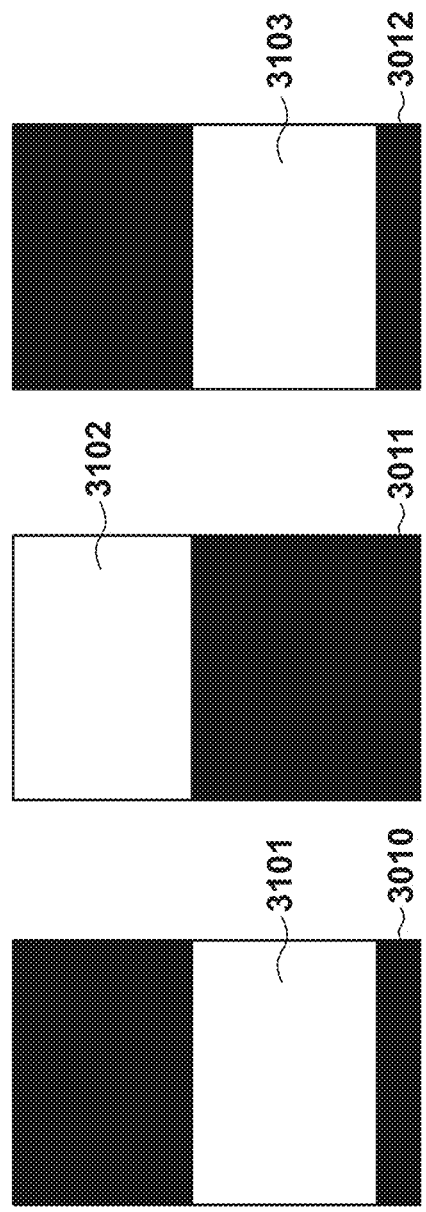

IMAGE PROCESSING APPARATUS, CONTROL METHOD, AND PRODUCT FOR DETERMINING DEFECT REPRODUCIBILITY BASED ON DEFECT POSITIONS ON RECORDING MEDIA CALCULATED FROM PHASE INFORMATION

BACKGROUND

Field of the Disclosure

The present disclosure relates to an image processing apparatus, a control method thereof, and a non-transitory computer-readable storage medium.

Description of the Related Art

When hardware such as a photosensitive drum included in a printing apparatus is damaged by wear due to mass printing or long-term operation, quality of the output printed matter may degrade. Specifically, stains caused by a color material such as ink or toner adhering to unintended portions repeatedly appear. Alternatively, the color material does not sufficiently adhere to a place where the color material is intended to adhere to form an image, and thus color loss in which the color is paler than it should be may repeatedly occur. If print defects such as stains or color loss described above repeatedly occur, the quality and yield of the printed matter decrease. Therefore, when the presence or absence of print defects is inspected and defects appear repeatedly, it is necessary to notify a user and guarantee the quality and yield of the printed matter. Since visual inspection for visually inspecting the presence of a print defect requires a lot of time and cost, an inspection system that automatically performs inspection has been proposed. In such an inspection system, for example, inspection is performed by calculating the presence or absence of a defect on the basis of a difference between a reference image that is an inspection reference for the printed matter registered in advance and an inspection target image obtained by scanning the printed matter to be inspected.

Japanese Patent No. 3576209 discloses that when a defect appears in the output image, the user repeatedly outputs a test image for defect reproduction and visually determines whether the same defect is repeated, and if it is repeated, the user scans the output test image and sends the scanned image and copier identification data to a remote diagnostic computer. However, the method described in Japanese Patent No. 3576209 requires a lot of time and cost because the reproducibility of the print defect is visually determined even if print defect inspection is automatically performed by the inspection system.

SUMMARY

Therefore, an inspection system that automatically determines whether a defect has reproducibility based on a scanned image is advantageous, but the reproduction position of the defect varies depending on the cycle length of the photosensitive drum and the intermediate transfer belt, the paper length, the image formation timeline, and the like, and thus it has been difficult to determine whether a defect has reproducibility based on a scanned image.

Some embodiments of the present disclosure have been made in view of such difficulties, and even if the position of a defect in images of a plurality of recording media printed by the printing apparatus varies, it is possible to determine the presence/absence of reproducibility of a defect due to printing in the printing apparatus.

According to an aspect of the disclosure, there is provided an image processing apparatus that is to be connected to a printing apparatus, that sequentially receives a plurality of recording media on which printing was performed by the printing apparatus, and that inspects a quality of images formed on the recording media, the image processing apparatus comprising: a reference image reception unit configured to receive a reference image; a scanned image reception unit configured to acquire a plurality of scanned images by sequentially scanning the recording media output from the printing apparatus and having the images to be inspected recorded thereon; a phase information reception unit configured to receive phase information of an image bearing member of the printing apparatus; a defect detection unit configured to, for each of the scanned images, detect a defect on the scanned image by comparing a pixel value of the reference image and a pixel value of the scanned image; and a determination unit configured to determine whether a defect has reproducibility based on positions of defects on the recording media calculated from the phase information.

According to some embodiments of the present disclosure, even if the position of the defect in the images of the recording media printed by the printing apparatus varies, it is possible to determine the presence/absence of reproducibility of a defect due to printing in the printing apparatus.

Further features of various embodiments will become apparent from the following description of exemplary embodiments with reference to the attached drawings.

BRIEF DESCRIPTION OF THE DRAWINGS

FIGS. 17A to 17C are diagrams illustrating an example of an image bearing member region image $I_{cur}$.

FIGS. 18A to 18C are diagrams illustrating an example of an image bearing member region image $I_{pre}$.

FIGS. 31A to 31L are diagrams illustrating generation processing of a paper white region image of the modified example.

DESCRIPTION OF THE EMBODIMENTS

Figure 1:
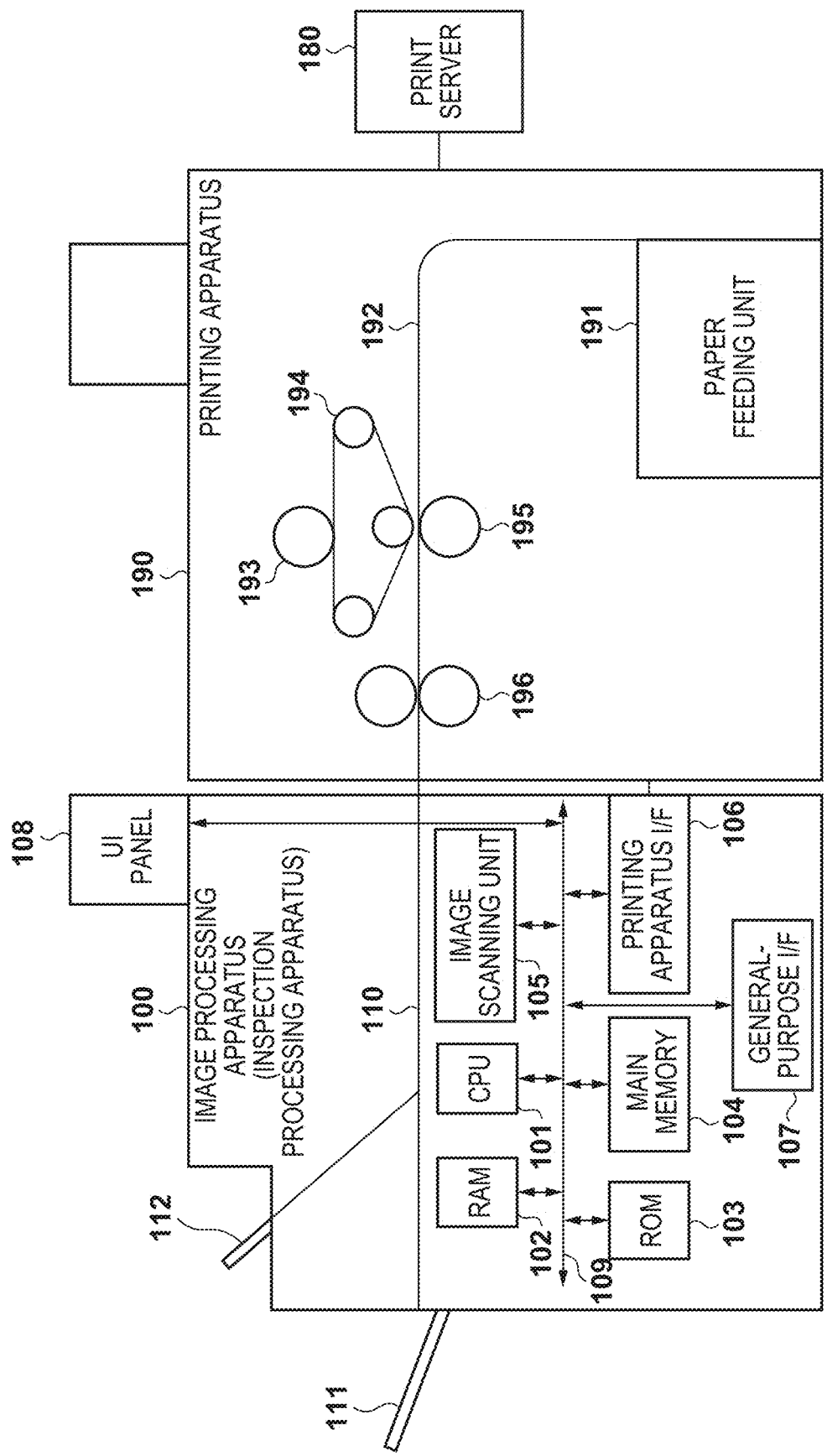
FIG. 1 is a configuration diagram of an entire printing system including an image processing apparatus.

Hereinafter, embodiments will be described in detail with reference to the attached drawings. Note, the following embodiments are not intended to limit the scope of every embodiment. Multiple features are described in the embodiments, but limitation is not made to embodiments that requires all such features, and multiple such features may be combined as appropriate. Furthermore, in the attached drawings, the same reference numerals are given to the same or similar configurations, and redundant description thereof is omitted.

First Embodiment

In the first embodiment, a method for determining whether there is reproducibility of a defect from a scanned image, even when a reproduction position of the defect varies depending on a cycle length of a photosensitive drum and an intermediate transfer belt, a paper length, an image formation timeline, or the like in a printing apparatus, will be described.

FIG. 1 is a configuration example of an entire printing system that inspects the quality of an image that is an output of printed matter, including an image processing apparatus 100 which the embodiment employs. The printing system in the present embodiment includes the image processing apparatus 100, a print server 180, and a printing apparatus 190. The print server 180 has a function of generating a print job of a document to be printed and submitting the print job to the printing apparatus 190. The printing apparatus 190 has a function of forming an image on a recording medium (e.g., printing paper) on the basis of the print job submitted from the print server 180. As the printing apparatus 190, an apparatus of an offset printing method, an electrophotographic recording method, or the like can be used. It is assumed that the printing apparatus 190 of the present embodiment is the printing apparatus of the electrophotographic recording method. The printing apparatus 190 has a paper feeding unit 191, and a user sets the printing paper in the paper feeding unit 191 in advance. When the print job is submitted, the printing apparatus 190 conveys the printing paper set in the paper feeding unit 191 along a conveying path 192. A toner image is formed on an image bearing member including a photosensitive drum 193, an intermediate belt 194, and the like in synchronization with conveyance of the printing paper, and the toner image is transferred on a surface of the printing paper by a voltage-applied transfer roller 195. The transferred toner image is fixed on the printing paper by a fixing roller 196, and is sent to the image processing apparatus 100 as printed matter on which the image is formed.

The image processing apparatus 100 of the present embodiment is connected to the printing apparatus 190, and performs inspection processing for checking the presence or absence of the defect in the paper, that is, the printed matter, that the printing apparatus 190 forms the image on and sends through the conveying path 192. That is, the image processing apparatus 100 functions as an inspection processing apparatus. The image processing apparatus 100 internally includes a CPU 101, a RAM 102, a ROM 103, a main memory 104, an image scanning unit 105 (hereinafter referred to as a scanner), an interface (I/F) 106 with the printing apparatus, a general-purpose interface (I/F) 107, a user interface (UI) panel 108, and a main bus 109. The image processing apparatus 100 further includes a printed matter conveying path 110 connected to the conveying path 192 of the printing apparatus 190, an output tray 111 of a printed product that has passed the inspection, and an output tray 112 of the printed matter that has been found to have a defect and failed the inspection. A switching unit (not illustrated) for switching which of the output trays 111 and 112 the printed matter is to be discharged is provided on the conveying path 110, and the switching unit operates according to the control of the CPU 101. It should be noted that classification of the printed matter is not limited to two types of pass and fail, and the printed matter may be further classified.

The CPU 101 is a processor that collectively controls each part in the image processing apparatus 100. The RAM 102 functions as a main memory, a work area, and the like of the CPU 101. The ROM 103 stores a group of programs executed by the CPU 101. The main memory 104 stores an application executed by the CPU 101, data used for image processing, and the like. The image scanning unit (hereinafter simply referred to as a scanner) 105 can scan one side or both sides of the printed matter sent from the printing apparatus 190 on the conveying path 110 and acquire it as image data. The printing apparatus I/F 106 is connected to the printing apparatus 190, and can synchronize the processing timing of the printed matter with the printing apparatus 190 and communicate the operating status of each other. The general-purpose I/F 107 is a serial bus interface such as USB or IEEE 1394, and the user can take out data such as a log and take some data into the image processing apparatus 100. The UI panel 108 is, for example, a liquid crystal display, functions as a user interface of the image processing apparatus 100, and displays a current status and settings, to inform the user. Further, the UI panel 108 includes a touch panel or buttons, to receive instructions from the user. The main bus 109 connects parts of the image processing apparatus 100 with each other. In addition, although omitted from FIG. 1, the switching unit is provided that can operate various parts inside the image processing apparatus 100 and the printing system according to an instruction from the CPU 101, for example, synchronously operate the conveying paths and switch which of the output tray 111 for pass and the output tray 112 for fail the printed matter is to be sent according to the inspection result. Further, a GPU may be provided in addition to the CPU.

As a whole, the image processing apparatus 100 performs the inspection processing described below on the basis of the image data of the printed matter scanned by the scanner 105 while conveying on the conveying path 110 the printed matter sent from the printing apparatus 190. As a result of the inspection processing, the printed matter that has passed the inspection is conveyed to the output tray 111 for pass, and the printed matter that has failed the inspection is conveyed to the output tray 112 for fail. Thus, only those having a confirmed quality can be collected in the output tray 111 as products for delivery.

Figure 2:
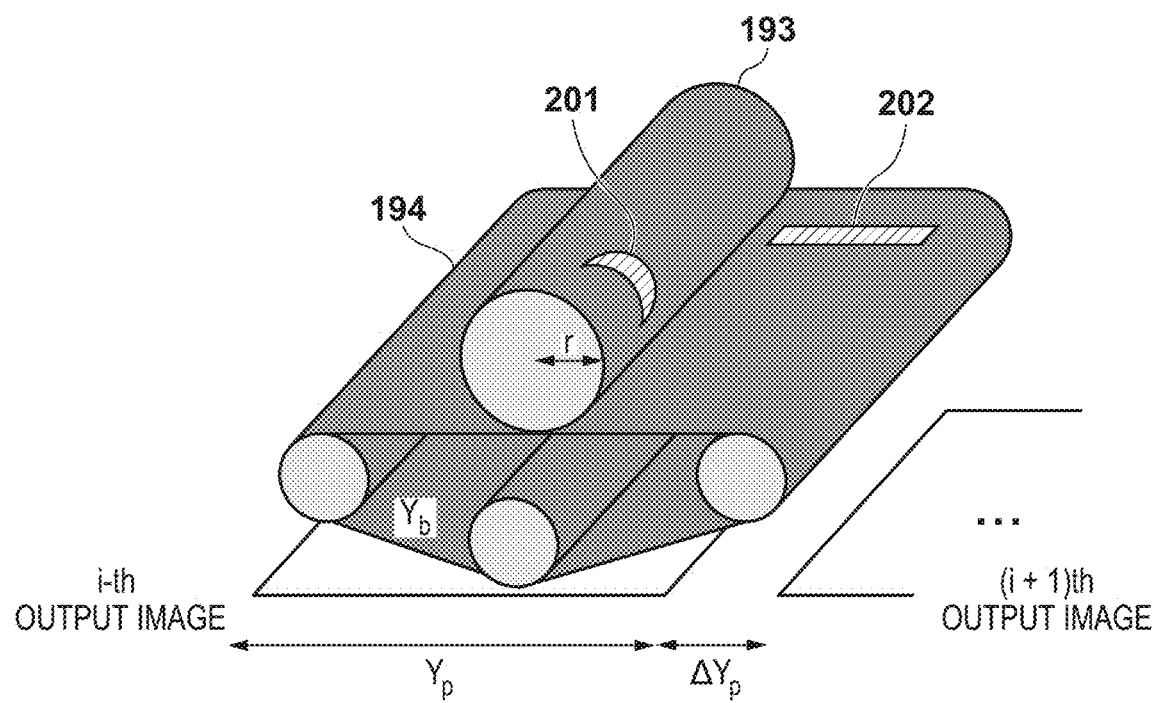
FIG. 2 is a diagram illustrating an example of a defect that is repeatedly reproduced.

With reference to FIG. 2, the defect will be described that is a detection target in the present embodiment and is repeatedly reproduced. The printing apparatus 190 has the image bearing member including the photosensitive drum 193 that forms the image according to the electrophotographic recording method and the intermediate belt 194. Although not illustrated, around the photosensitive drum 193 in the image bearing member, there are provided a charger that charges a surface of the photosensitive drum 193, a laser element that generates laser light according to the image data, a polygon mirror that rotates driven by a motor and reflects the laser light toward the photosensitive drum 193, and a developing unit that forms the toner image by adhering toner to an electrostatic latent image formed on the photosensitive drum 193.

After the print job is submitted, the printing apparatus 190 forms the toner image according to a well-known electrophotographic recording method on the photosensitive drum 193 that rotates in synchronization with the conveyance of the printing paper, and transfers the formed toner image to the intermediate belt 194. Then, the toner image on the intermediate belt 194 is transferred to the surface of the conveyed printing paper by the voltage-applied transfer roller 195.

When scratches 201 and 202 illustrated in FIG. 2 are formed on the photosensitive drum 193 and the intermediate belt 194, unintended toner adheres due to voltage application, or sufficient toner does not adhere and a good image is not formed on regions of the scratches 201 and 202. Then, as a result of the photosensitive drum 193 and the intermediate belt 194 rotating and repeatedly forming and transferring an output image, the unintended toner adheres on an image region corresponding to the scratches 201 and 202 or the printed matter to which the toner does not sufficiently adhere is repeatedly output.

Figure 3:
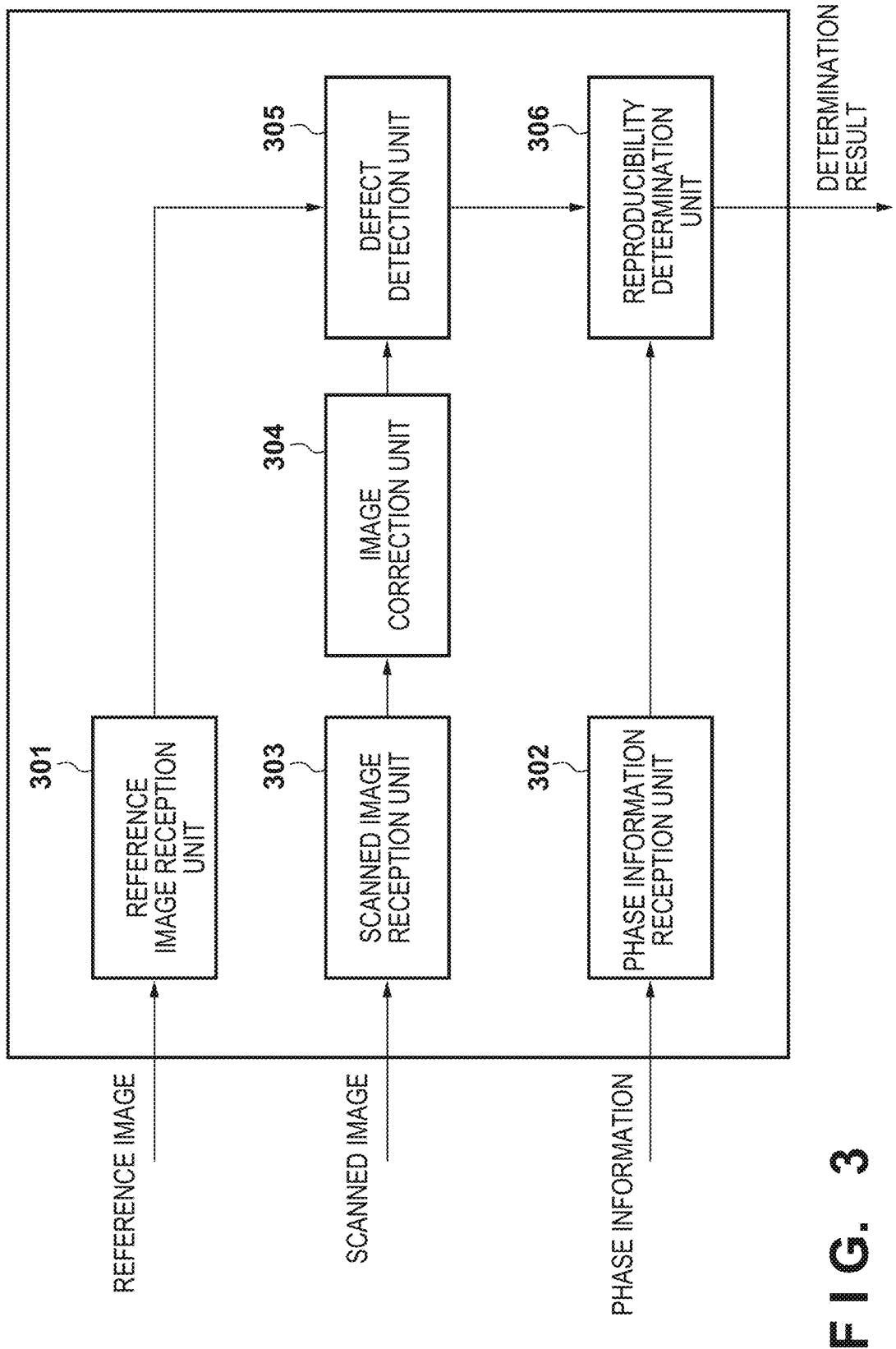
FIG. 3 is a block diagram illustrating a functional configuration of the image processing apparatus.

FIG. 3 illustrates a functional configuration diagram of the image processing apparatus 100 according to the embodiment. This functional configuration is achieved by the CPU 101 of the image processing apparatus 100 executing a program for implementing the function. Note that the program is stored in the ROM 103 or the main memory 104.

A reference image reception unit 301 receives a reference image that is stored in advance in the RAM 102 or the main memory 104 and is an inspection reference for the printed matter. The reference image reception unit 301 outputs the received reference image to a defect detection unit 305. It should be noted that the reference image is an ideal image assuming that the image recorded on the recording medium without defects is scanned. Then, the reference image is sent from the printing apparatus 190 or the print server 180 at the time of start processing in an inspection mode, and is stored in the RAM 102 or the main memory 104.

A phase information reception unit 302 receives phase information stored in the RAM 102 or the main memory 104 and outputs the phase information to a reproducibility determination unit 306. Here, the phase information is information associating a rotational phase of the image bearing member obtained by synchronizing the printing apparatus 190 and the image processing apparatus 100 by communicating with the printing apparatus 190 through the printing apparatus I/F 106, and a scanning pixel position of the scanner 105.

A scanned image reception unit 303 causes the scanner 105 to scan the printed matter that is discharged from the printing apparatus 190 in synchronization with the signal input through the printing apparatus I/F 106 and is conveyed on the conveying path 110. Then, the scanned image reception unit 303 receives the image data obtained by scanning by the scanner 105, and outputs the received image data as the scanned image to an image correction unit 304.

The image correction unit 304 corrects conveying position displacement of the printed matter conveyed on the conveying path 110 and position displacement due to the bending of the paper, for the scanned image. The image correction unit 304 outputs the corrected image to the defect detection unit 305.

The defect detection unit 305 generates defect information indicating the defect on the corrected image from the defect image generated on the basis of a difference between the corrected image and the reference image. Then, the defect detection unit 305 outputs the generated defect information to the reproducibility determination unit 306.

The reproducibility determination unit 306 calculates a generation position of the defect on the image bearing member, such as the photosensitive drum 193 and the intermediate belt 194, for the defect generated on a plurality of the scanned images on the basis of the phase information, and determines the reproducibility of the defect detected in between the scanned images. Then, the reproducibility determination unit 306 outputs the determination result to the UI panel 108 or the printing apparatus 190.

Operation of Image Processing Apparatus 100

Figure 4:
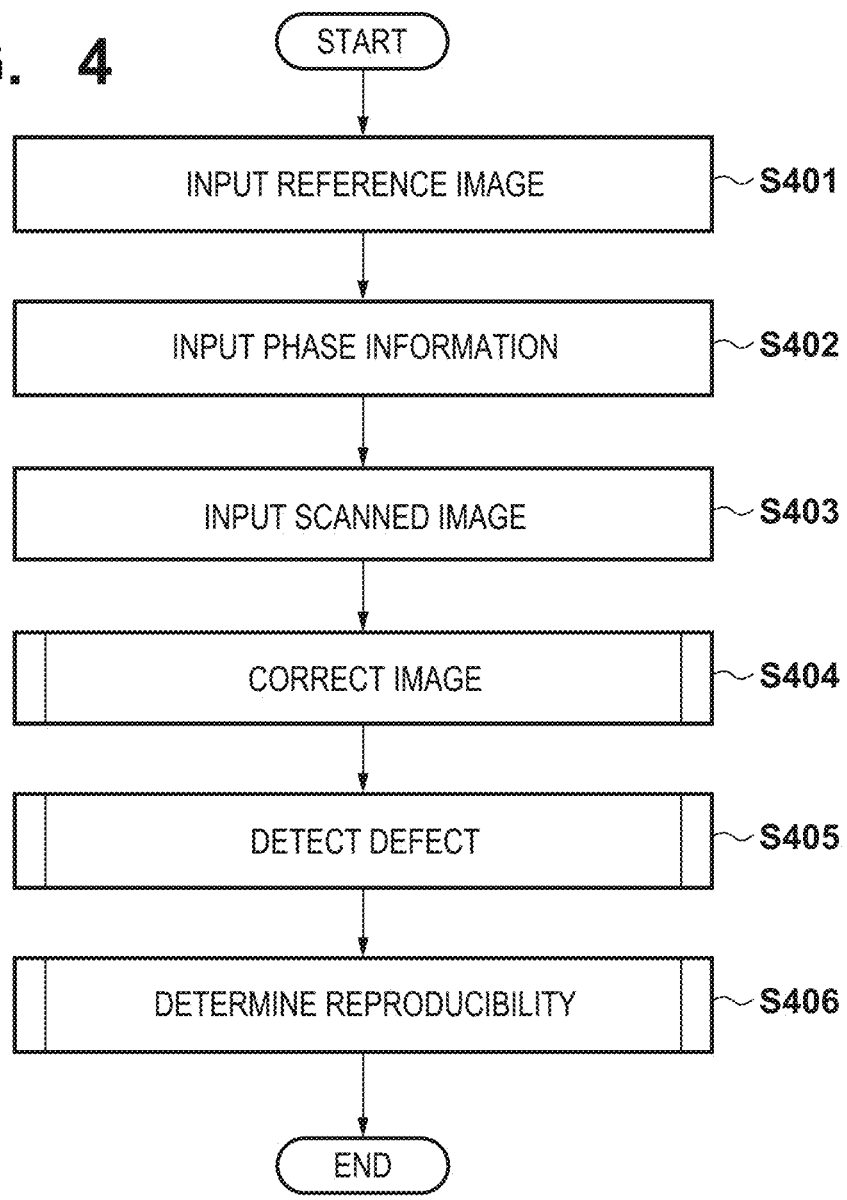
FIG. 4 is a flowchart illustrating a flow of processing performed in image processing.

An operation of the image processing performed by the image processing apparatus 100 will be described. FIG. 4 is a flowchart of the image processing performed by the image processing apparatus 100. The processing according to the flowchart of the figure is realized by the CPU 101 reading and executing the program stored in the ROM 103 or the main memory 104. Note that in the following description, each step is indicated by adding "S".

Figure 5:
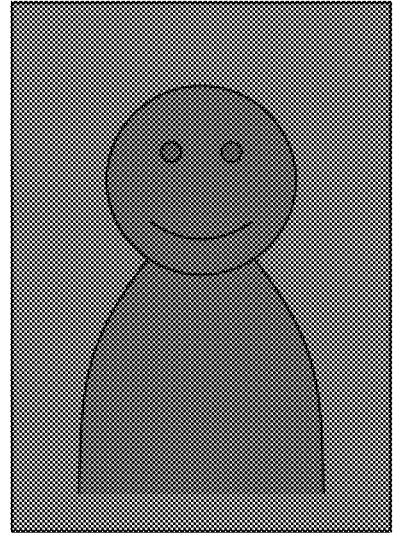
FIG. 5 is a diagram illustrating an example of a reference image.

In step S401, the reference image reception unit 301 receives the reference image that is the inspection reference for the printed matter stored in the RAM 102 or the main memory 104. The reference image may be set as, for example, the scanned image of the printed matter visually determined to have no defects in advance. In the present embodiment, the reference image illustrated in FIG. 5 is received. In the present embodiment, as the reference image, the image data in which one grayscale pixel is 8 bits (256 gradations) is received.

Figure 6A:
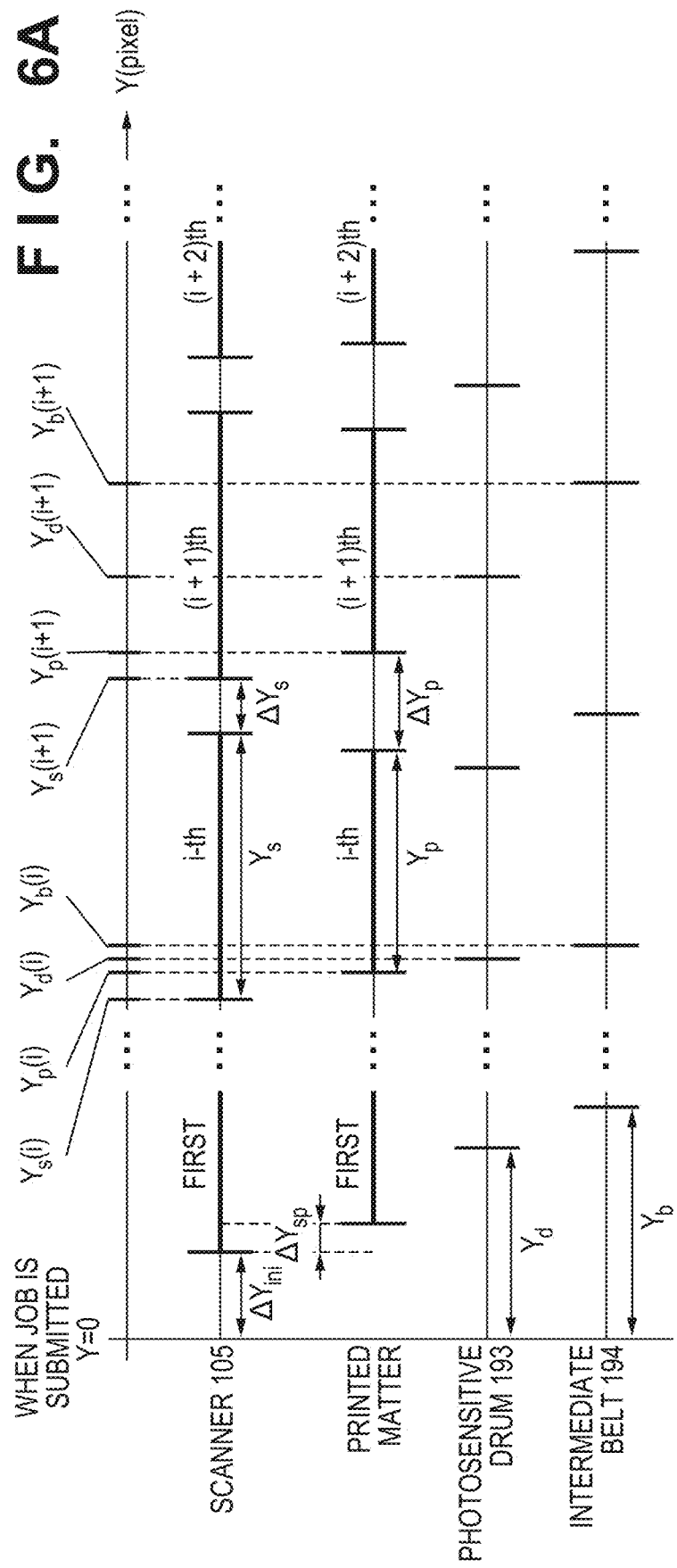
FIGS. 6A and 6B are diagrams illustrating an example of phase information.

In step S402, the phase information reception unit 302 receives the phase information stored in the RAM 102 or the main memory 104. In the present embodiment, conveyance timing of the printed matter and the correspondence between the rotational phase of the image bearing member including the photosensitive drum 193 and the intermediate belt 194 and the scanning pixel position of the scanner 105 are received as the phase information. FIG. 6A is a graph illustrating the positional relationship, such as rotational phases of the printed matter and the photosensitive drum 193, that are obtained from the operation timing after the print job is submitted. The horizontal axis is the position coordinate with the origin of Y=0 when the job is submitted, and is a value converted into pixels by scanned image resolution. $Y_s(i)$ is a scan start position of the i-th printed image. $Y_p(i)$ is a start position where the printed matter for outputting the i-th printed image is conveyed on the scanner 105. $Y_d(i)$ and $Y_b(i)$ are start positions of the photosensitive drum 193 and the intermediate belt 194 that first appear on the i-th scanned image. These start positions are calculated according to the following equation (1).

$$Y_s(i) = (i-1) \cdot (Y_s + \Delta Y_s) + \Delta Y_{ini}$$

$$Y_p(i) = Y_s(i) + \Delta Y_{sp}$$

$$Y_d(i) = \operatorname*{argmin}_{j \in Y_d(i) > Y_s(i)} (Y_d \cdot j)$$

$$Y_b(i) = \operatorname*{argmin}_{j \in Y_b(i) > Y_s(i)} (Y_b \cdot j)$$

(1)

Here, $Y_s$ is the number of pixels in a height direction of the scanned image, and $\Delta Y_s$ is a value obtained by converting a time interval between an end and a start of the scanning into pixels by the scanned image resolution. $\Delta Y_{ini}$ is a value obtained by converting a time interval between a time when the job is submitted and a start of a first scanned image into pixels by the scanned image resolution. $\Delta Y_{sp}$ is a value obtained by converting a time interval from the start of the scanning until a time when the printed matter is conveyed on the scanner 105 into pixels by the scanned image resolution. $Y_d$ and $Y_b$ are values obtained by converting a period of the photosensitive drum 193 and the intermediate belt 194 into pixels by the scanned image resolution.

Figure 6B:
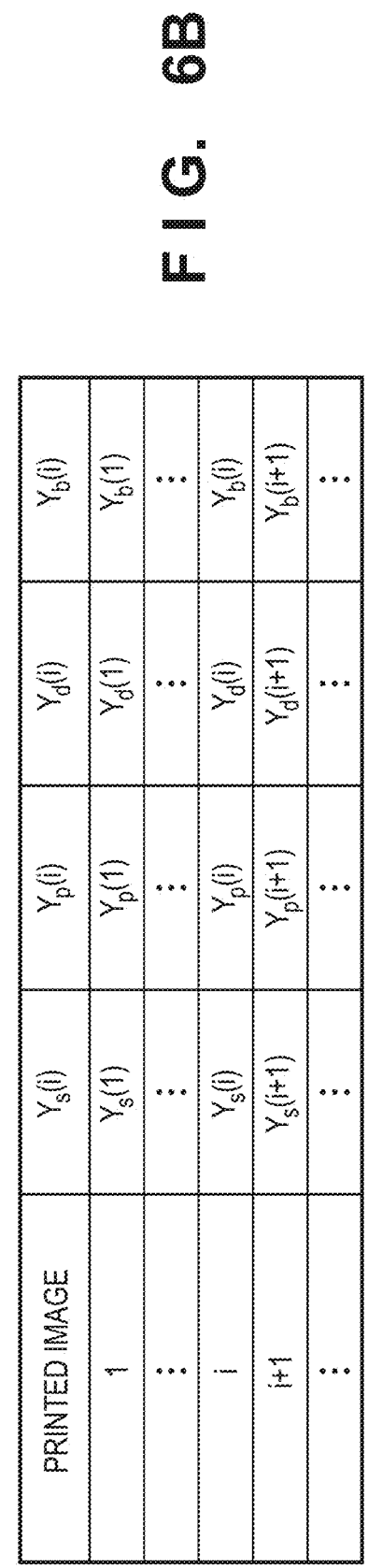

FIG. 6B is the positional relationship of FIG. 6A, and phase information obtained from the above equation (1), and is a correspondence list of start positions of the scanner 105, the printed matter, the photosensitive drum 193, and the intermediate belt 194.

Figure 7:
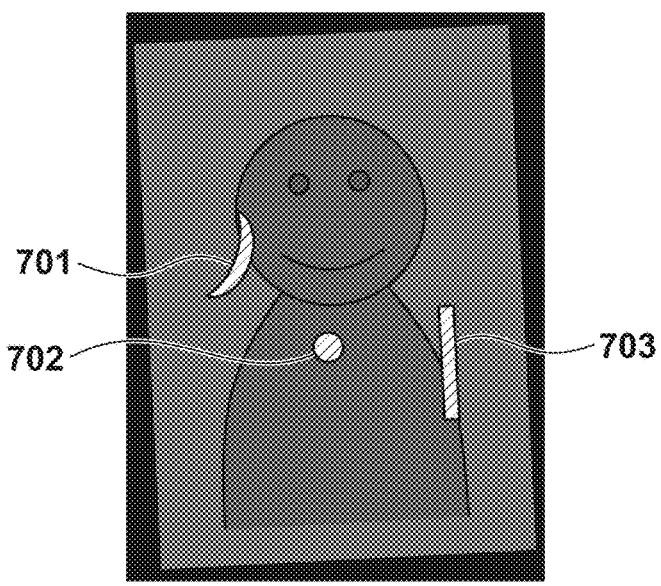
FIG. 7 is a diagram illustrating an example of a scanned image.

In step S403, the scanned image reception unit 303 acquires the image data (scanned image) by scanning the printed matter. In the present embodiment, it is assumed that the scanned image illustrated in FIG. 7 is received. The scanned image illustrated in the figure is an image in which the printed matter is tilted counterclockwise due to the conveying position displacement and defects 701, 702, and 703 are generated on the output image. In the present embodiment, the scanned image is grayscale image data of 8 bits per pixel.

Figure 8:
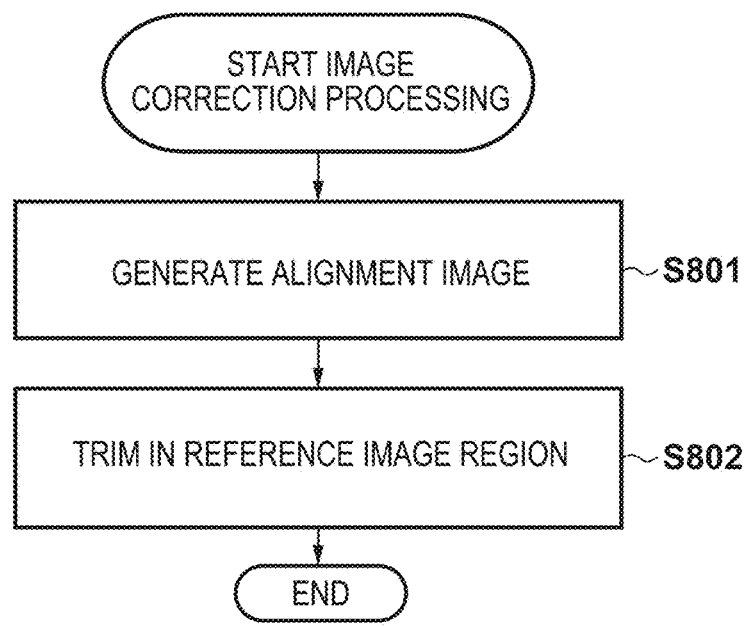
FIG. 8 is a flowchart of image correction processing.
Figure 9:
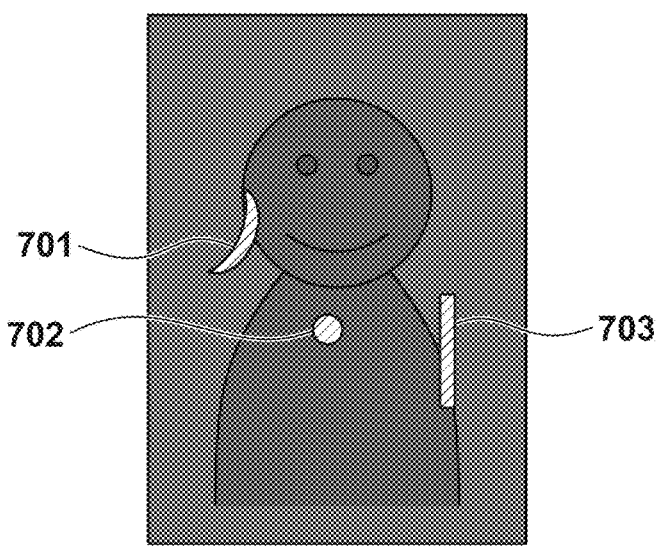
FIG. 9 is a diagram illustrating an example of a corrected image.

In step S404, the image correction unit 304 corrects the conveying position displacement of the printed matter conveyed on the conveying path 110 and the position displacement due to the bending of the paper, for the scanned image. Details of this image correction processing will be described later with reference to FIG. 8. In the present embodiment, tilt due to the conveying position displacement of the printed matter illustrated in FIG. 9 is corrected, and the corrected image in which a region outside the printing paper is trimmed is generated.

Figure 10:
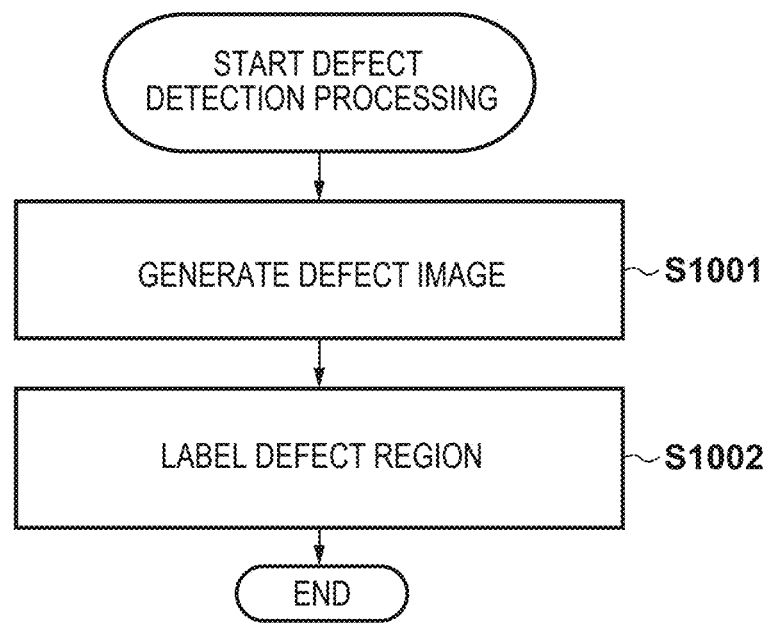
FIG. 10 is a flowchart of defect detection processing.
Figure 11:
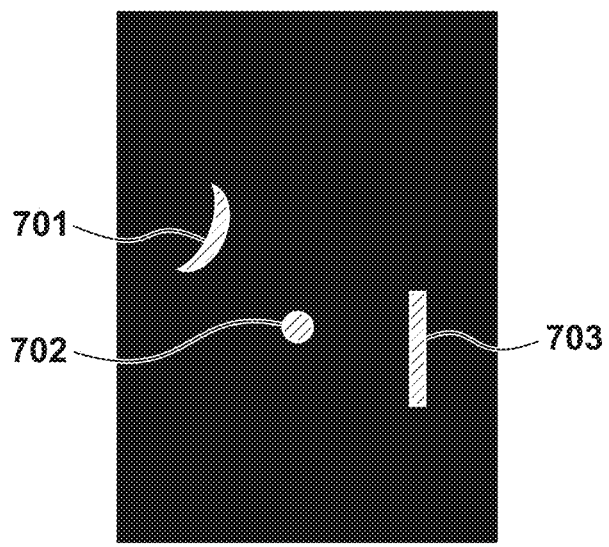
FIG. 11 is a diagram illustrating an example of a defect image.

In step S405, the defect detection unit 305 detects a pixel region having a large difference value on the defect image as the defect, from the defect image generated on the basis of the difference between the corrected image and the reference image. Details of defect detection processing will be described later with reference to FIG. 10. In the present embodiment, the defect image illustrated in FIG. 11 is generated from the difference between the corrected image and the reference image, and pixel regions of the defects 701, 702, and 703 are detected as defect regions.

Figure 12:
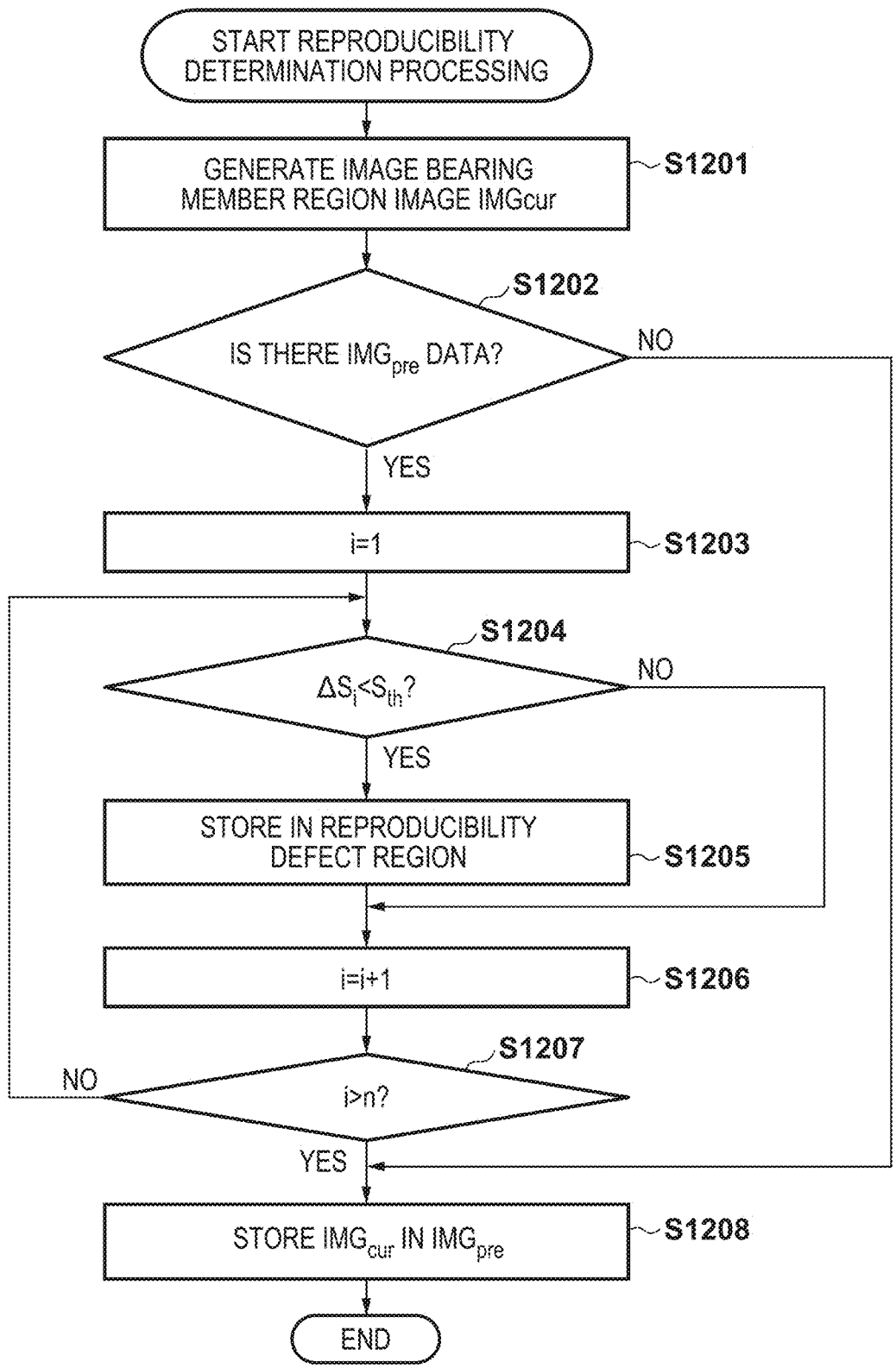
FIG. 12 is a flowchart of reproducibility determination processing.
Figure 13:
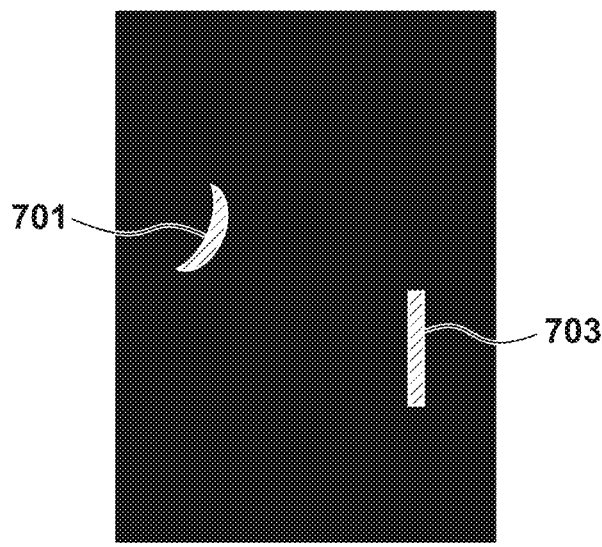
FIG. 13 is a diagram illustrating an example of a determination result.

In step S406, the reproducibility determination unit 306 calculates from the phase information a position where the defect occurs on the image bearing member, such as the photosensitive drum 193 and the intermediate belt 194, which corresponds to defect pixel positions detected in the scanned images, and determines the reproducibility of the detected defect between the scanned images. Details of reproducibility determination processing will be described later with reference to FIG. 12. In the present embodiment, by comparing the positions of the defects detected on the i-th scanned image and the (i+1)th scanned image on the basis of the phase information, the defects 701 and 703 illustrated in FIG. 13 are determined as reproducible defects. The determination result is output to the UI panel 108 or the printing apparatus 190, and the processing is terminated.

Operation of Image Correction Unit 304

Next, the details of the image correction processing in the above step S404 will be described with reference to a flowchart of FIG. 8.

Figure 14:
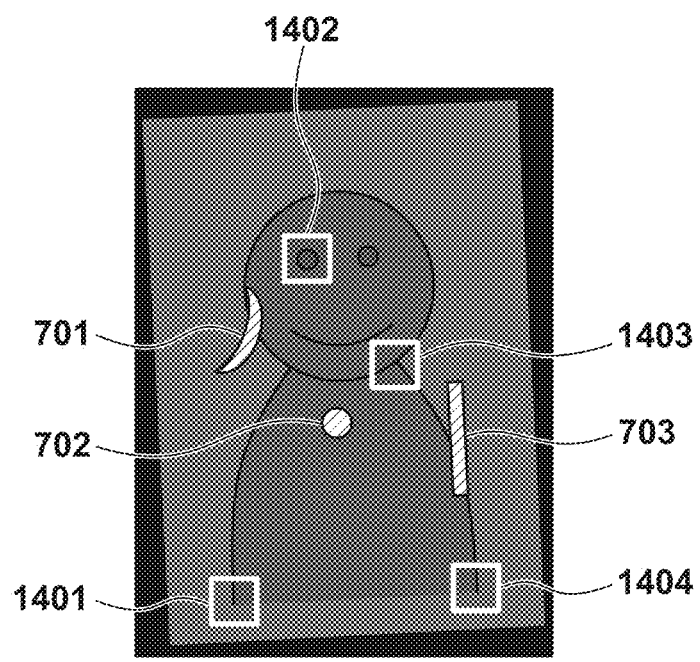
FIG. 14 is a diagram illustrating an example of an alignment image.
Figure 15:
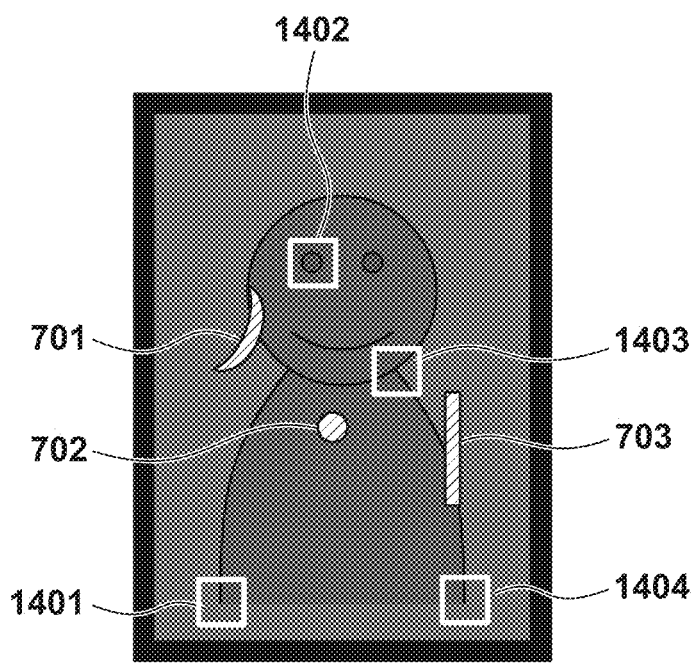
FIG. 15 is a diagram illustrating an example of a trimmed alignment image.

In step S801, the image correction unit 304 corrects the conveying position displacement of the printed matter conveyed on the conveying path 110 and the position displacement due to the bending of the paper, for the scanned image. The image correction unit 304 of the present embodiment detects feature points on the reference image and the scanned image by a known template matching technique, and calculates an affine transformation matrix for movement and rotation to align pixel positions between the feature points. Then, the image correction unit 304 uses the calculated affine transformation matrix, to generate an image in which the pixel position of the scanned image is aligned with the pixel position of the reference image. In the present embodiment, as illustrated in FIG. 14, pixel regions 1401 to 1404 are detected as the feature points and subjected to affine transformation processing, and thus an alignment image illustrated in FIG. 15 is generated.

In step S802, the image correction unit 304 generates an image obtained by trimming the alignment image in the image region of the reference image, and ends the processing. In the present embodiment, the corrected image illustrated in FIG. 9 is generated by trimming the alignment image illustrated in FIG. 15 in a reference image region illustrated in FIG. 5.

Operation of Defect Detection Unit 305

Next, the details of the defect detection processing in the above step S405 will be described with reference to a flowchart of FIG. 10.

Figure 16A:
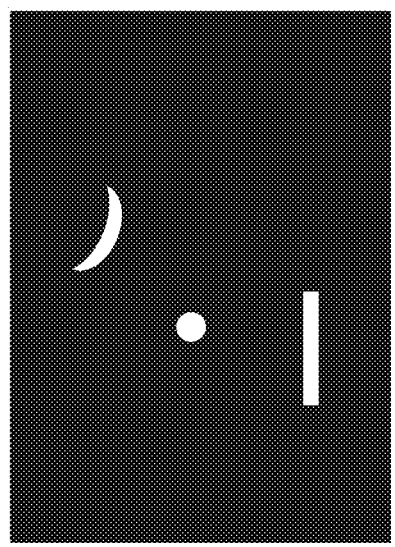
FIGS. 16A and 16B are diagrams illustrating the defect detection processing.

In step S1001, the defect detection unit 305 generates a difference image ΔIMG having a pixel value of an absolute value of a difference between the pixel value of the corrected image and the pixel value of the reference image. A defect image $IMG_{def}$ is generated by performing binarization processing on the difference image ΔIMG at a preset threshold $I_{th}$. Since it is the binarization processing, one bit is sufficient for each pixel constituting the defect image $IMG_{def}$. Here, the threshold $I_{th}$ is a threshold for detecting the defect region, and in the present embodiment, $I_{th}=10$, but it may be set by the user. In the present embodiment, a binarized image illustrated in FIG. 16A is generated, the binarized image having a pixel value 255 in a pixel region where the absolute value of the difference between the corrected image and the reference image is larger than the threshold $I_{th}$ and a pixel value 0 in a pixel region where the absolute value is not larger than the threshold $I_{th}$.

Figure 16B:
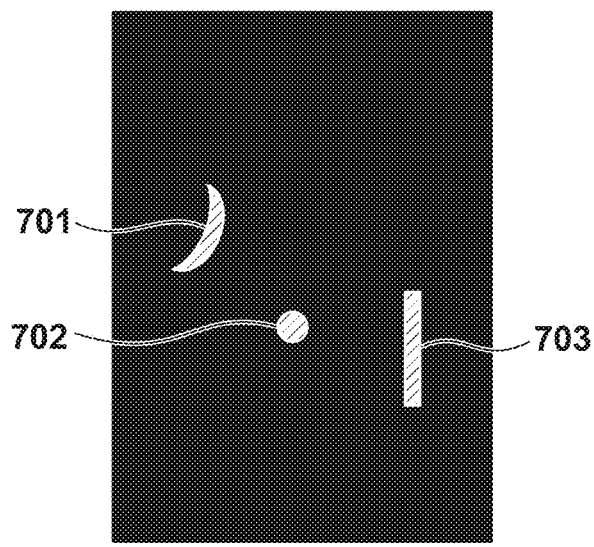

In step S1002, the defect detection unit 305 labels each defect region on the defect image $IMG_{def}$ and ends the processing. In the present embodiment, defect region numbers "1", "2", and "3" are labeled to the defects 701, 702, and 703 illustrated in FIG. 16B.

Operation of Reproducibility Determination Unit 306

Next, the details of the reproducibility determination processing in step S406 of FIG. 4 will be described with reference to a flowchart of FIG. 12.

In step S1201, the reproducibility determination unit 306 generates an image bearing member region image $IMG_{cur}$ indicating the position of the defect detected on a scanned image $IMG_{scan}$ on the image bearing member, such as the photosensitive drum 193 and the intermediate belt 194. Specifically, the reproducibility determination unit 306 calculates a pixel position $Y_{d\_cur}$ corresponding to a start position $Y_d$ of the photosensitive drum 193 on the defect image with respect to the defect image illustrated in FIG. 16A, from a start position $Y_s$ of the scanned image and the start position $Y_d$ of the photosensitive drum 193, which are the phase information illustrated in FIG. 6B. In the present embodiment, the pixel position $Y_{d\_cur}$ illustrated in FIG. 17A corresponds to the start position of the photosensitive drum 193. Further, the defect image $IMG_{def}$ is regionally divided by a period $2\pi r$ of the photosensitive drum 193 with reference to the pixel position $Y_{d\_cur}$ that is the start position of the photosensitive drum 193. In the present embodiment, divided images $IMG_{cur1}$, $IMG_{cur2}$, and $IMG_{cur3}$ illustrated in FIG. 17B are generated as region images showing the positions of the defects generated on the photosensitive drum 193. Regions 1701 and 1702 are image regions on the divided images $IMG_{cur1}$ and $IMG_{cur3}$ that are not reflected on the defect image $IMG_{def}$, and in the present embodiment, they are image regions having a pixel value of "128".

The reproducibility determination unit 306 generates the image bearing member region image $IMG_{cur}$ indicating the position of the defect detected on the scanned image $IMG_{scan}$ on the image bearing member based on the following equation (2), between the region images.

$$IMG_{cur} = \begin{cases} \max_{i \neq j}(IMG_{cur_i}, IMG_{cur_j}) & ((IMG_{cur_i} \neq 128) \cap (IMG_{cur_j} \neq 128)) \\ IMG_{cur_i} & ((IMG_{cur_i} \neq 128) \cap (IMG_{cur_j} = 128)) \\ IMG_{cur_j} & ((IMG_{cur_i} = 128) \cap (IMG_{cur_j} \neq 128)) \end{cases} \quad (2)$$

In the present embodiment, as illustrated in FIG. 17C, the image bearing member region image $IMG_{cur}$ is generated from the divided images $IMG_{cur1}$, $IMG_{cur2}$, and $IMG_{cur3}$.

In step S1202, the reproducibility determination unit 306 determines whether the RAM 102 or the main memory 104 stores an image bearing member region image $IMG_{pre}$ indicating the position of the defect already detected on an image bearing member region. If the $IMG_{pre}$ is stored, the reproducibility determination unit 306 determines that it is possible to determine the reproducibility of the defect on the scanned image $IMG_{scan}$, and shifts the processing to step S1203. Further, if the $IMG_{pre}$ is not stored, the reproducibility determination unit 306 determines that the reproducibility of the defect cannot be determined, and shifts the processing to step S1208. In the present embodiment, the defect image illustrated in FIG. 18A is divided into $IMG_{pre1}$ and $IMG_{pre2}$ illustrated in FIG. 18B by the period of $2\pi r$ of the photosensitive drum 193 with reference to a pixel position $Y_{d\_pre}$ corresponding to the start position of the photosensitive drum 193. Regions 1801 and 1802 are image regions on the divided images $IMG_{pre1}$ and $IMG_{pre2}$ that are not reflected on the defect image, and in the present embodiment, they are image regions having a pixel value of "128". Further, as illustrated in FIG. 18C, the image bearing member region image $IMG_{pre}$ indicating the position of the defect already detected on the image bearing member region generated according to the equation (2) is assumed to be stored in advance. Defects 1803, 1804, and 1805 are generated on the image $IMG_{pre}$.

In step S1203, the reproducibility determination unit 306 initializes a variable i indicating the defect region number with "1". In step S1204, the reproducibility determination unit 306 determines whether an amount $\Delta S_i$ of position displacement of a defect region i satisfies $\Delta S_i < S_{th}$ according to the following equation (3).

$$\Delta S_i = \frac{\sum_{(x,y) \in S_i} |IMG_{cur}(x, y) - IMG_{pre}(x, y)|}{S_i} < S_{th} \quad (3)$$

Figure 19:
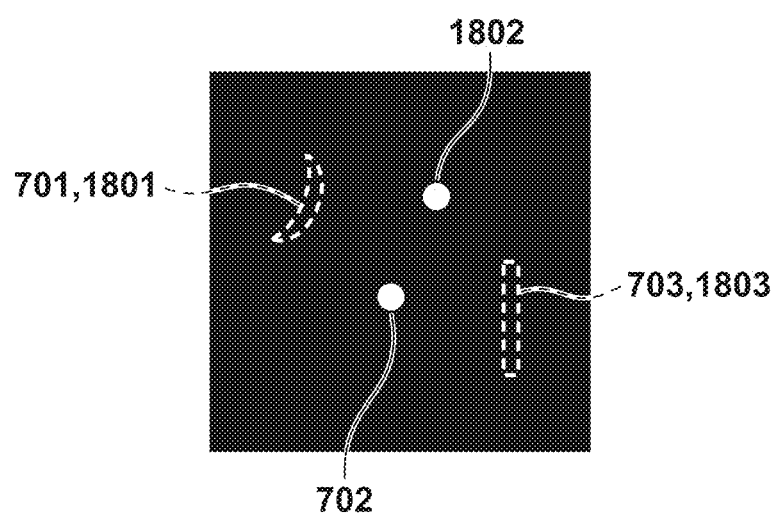
FIG. 19 is a diagram illustrating the reproducibility determination processing.

In the present embodiment, the amount of position displacement of the defect region i is calculated from a ratio of an area $\Delta S_i$ of the defect region i remaining on the difference image to the area $S_i$ of the defect region i on the $IMG_{cur}$. $S_{th}$ is a threshold for determining the reproducibility of the defect region, and $S_{th}=0.1$ in the present embodiment. If $\Delta S_i < S_{th}$ is satisfied, the reproducibility determination unit 306 determines that the defect region i is the defect that is repeatedly reproduced, and shifts the processing to step S1205. If $\Delta S_i < S_{th}$ is not satisfied, the reproducibility determination unit 306 determines that the defect region i is a randomly generated defect, and shifts the processing to step S1206. In the present embodiment, the image illustrated in FIG. 19 is generated as an image having an absolute value of a difference between the image bearing member region images $IMG_{cur}$ and $IMG_{pre}$ illustrated in FIGS. 17C and 18C as the pixel value. In the pixel region of the defects 702 and 1804, the defect is not reproduced at the same position in $IMG_{cur}$ and $IMG_{pre}$, and thus the absolute value of the difference is 255. In the pixel regions of the defects 701 (1803) and 703 (1805), the defects are repeatedly reproduced in $IMG_{cur}$ and $IMG_{pre}$, and thus the absolute value of the difference is 0. Therefore, amounts $\Delta S_1$ and $\Delta S_2$ of position displacement of the defect regions 1 and 2 satisfy $\Delta S_1=0$ and $\Delta S_2=0<S_{th}$, and the defects 701 and 702 generated in the defect regions 1 and 2 are determined to be the defects that are repeatedly reproduced.

In step S1205, the reproducibility determination unit 306 stores the defect region i in the RAM 102 or the main memory 104 as a reproducible defect region where the defect is repeatedly reproduced. In step S1206, the reproducibility determination unit 306 increments (updates) the variable i indicating the defect region number by "1".

In step S1207, the reproducibility determination unit 306 determines whether the defect region number i satisfies i>n. When it is determined that i>n is satisfied, the reproducibility determination unit 306 determines that the determination processing has been performed on all the defect regions, and shifts the processing to step S1208. On the other hand, if it is determined that i>n is not satisfied, the reproducibility determination unit 306 returns the processing to step S1204.

In step S1208, the reproducibility determination unit 306 stores the $IMG_{cur}$ in the RAM 102 or the main memory 104 as the image bearing member region image $IMG_{pre}$ indicating the position of the defect already detected on the image bearing member region, and ends this processing.

FIG. 13 is an image illustrating the pixel positions of the defects that are determined to be repeatedly reproduced by the reproducibility determination processing of the present embodiment. In the present embodiment, the defects 701 and 703 are determined to be defects that are repeatedly reproduced, and the user is warned by displaying the defect region on a UI of a display device (not illustrated).

By performing the image processing described above, even when the reproduction position of the defect varies due to the cycle length of the photosensitive drum and the intermediate transfer belt, the paper length, the image formation timeline, or the like, it is possible to determine the presence/absence of reproducibility of a defect from the scanned image.

In the present embodiment, an 8-bit grayscale image is used, but an RGB color image may also be used. Further, the number of bits may be 16 bits, and the number of channels and the number of bits of the image data are not limited.

Further, in the present embodiment, the image is aligned by affine transformation at the time of alignment processing, but projection transformation may be used, and geometric transformation processing is not particularly limited.

Further, in the present embodiment, the position displacement of the defect detected between a plurality of the defect images is calculated from the ratio of the area remaining on the difference image between the defect images to the area of the defect region, but it may be calculated from the position displacement of the center of gravity of the defect region, and a method for calculating the position displacement of the defect is not particularly limited.

In the present embodiment, the reproducibility of the defect is determined by the printing apparatus that outputs the image with one photosensitive drum and one intermediate belt, but for example, the photosensitive drum may be four CMYK drums, and the number and configuration of the image bearing member for determining the reproducibility are not particularly limited.

In the present embodiment, the user is warned by displaying a defect region image determined to be reproduced repeatedly on the UI, but error information of occurrence of repeated defects may be output to the printing apparatus 190, to stop the print job of the printing apparatus 190, and a method for outputting the error information is not particularly limited.

Second Embodiment

In the first embodiment, a determination is made regarding the presence/absence of reproducibility of a defect due to a scratch on the photosensitive drum 193 having a period shorter than the height of the defect image. However, when the defect is repeatedly generated due to the scratch on the intermediate belt 194 having a period longer than the height of the defect image, the defect is detected on the defect images every plurality of printing papers. As a result, when the defects are compared between consecutive defect images, the reproducibility may be erroneously determined. Therefore, in a second embodiment, a method for determining with high accuracy the reproducibility of the defect caused by the scratch on the intermediate belt 194 having a period longer than the height of the defect image by masking the pixel region corresponding to the defect image as a determination region in the image bearing member region will be described.

Figure 20A:
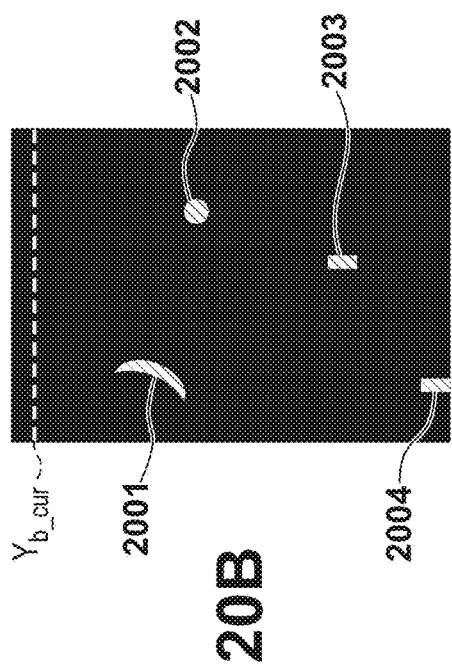
FIGS. 20A to 20D are diagrams illustrating an example of the scanned image and the image bearing member region image $I_{cur}$ of a second embodiment.
Figure 20B:
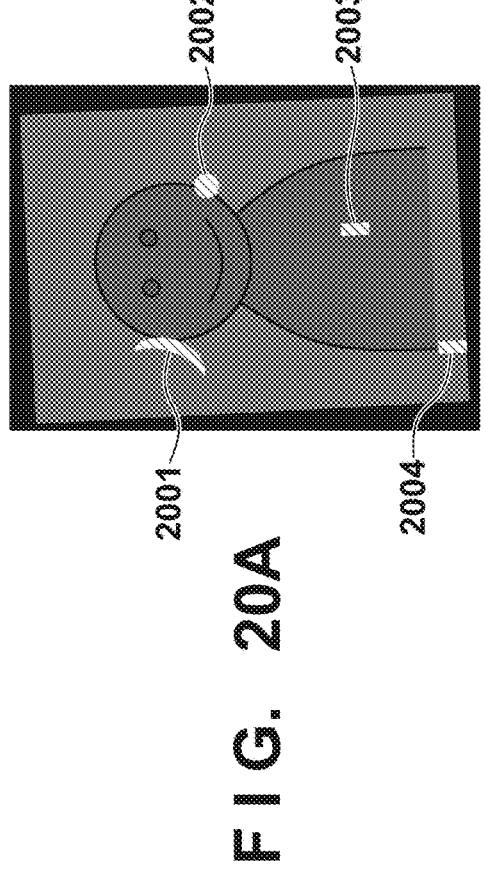
Figure 20C:
Figure 20D:
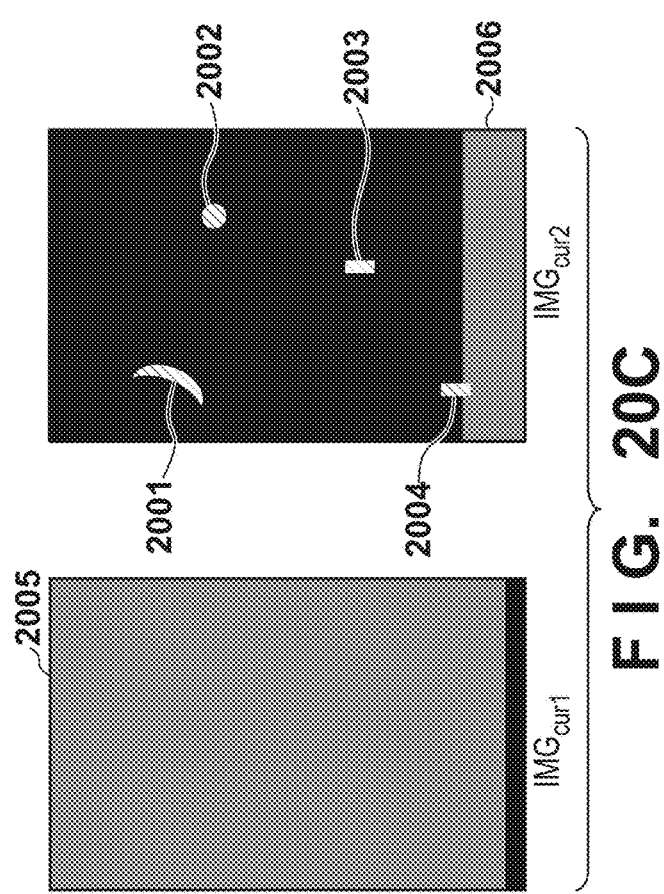

In the present embodiment, the scanned image illustrated in FIG. 20A is received. The scanned image is an image that is tilted counterclockwise due to the conveying position displacement of the printed matter and has defects 2001 to 2004 generated on the output image. The defect image illustrated in FIG. 20B is generated by taking a difference between the scanned image after undergoing correction processing and the reference image, and the pixel regions of the defects 2001 to 2004 are detected as the defect regions. Further, the defect image, in which the region is divided by a period $Y_b$ of the intermediate belt 194 with reference to a pixel position $Y_{b\_cur}$ corresponding to the start position of the intermediate belt 194 in FIG. 20B, will be $IMG_{cur1}$ and $IMG_{cur2}$ illustrated in FIG. 20C. Regions 2005 and 2006 are image regions on the divided images $IMG_{cur1}$ and $IMG_{cur3}$ that are not reflected on the defect image $IMG_{def}$, and in the present embodiment, they are image regions having a pixel value of "128". FIG. 20D is the image bearing member region image $IMG_{cur}$ generated from the divided images $IMG_{cur1}$ and $IMG_{cur2}$ according to the equation (2). A region 2007 on the $IMG_{cur}$ is an image region that is not reflected on the defect image $IMG_{def}$ and is the image region having a pixel value of "128".

Operation of Reproducibility Determination Unit 306

Figure 21:
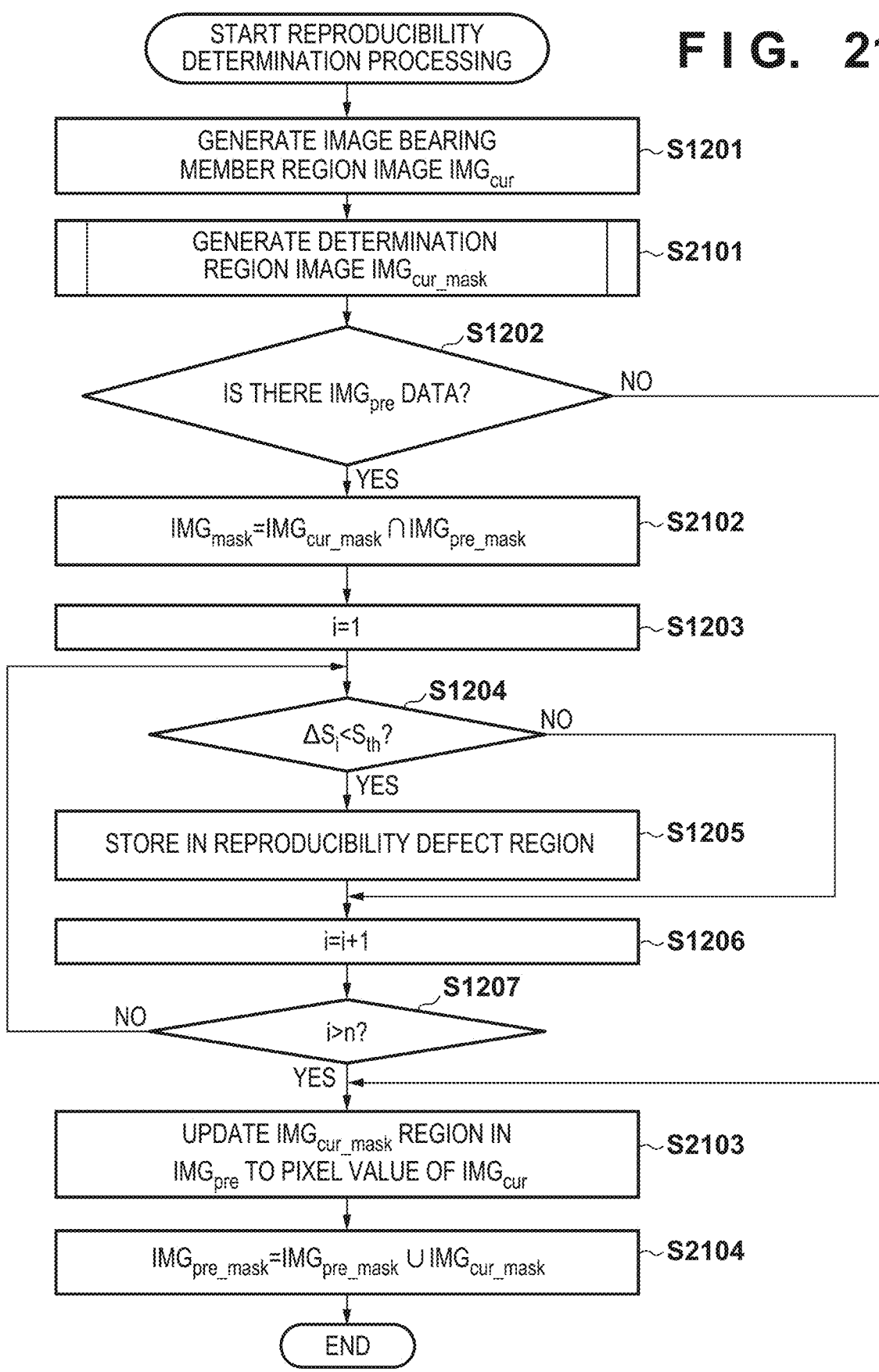
FIG. 21 is a flowchart of the reproducibility determination processing of the second embodiment.

A flow of the reproducibility determination processing of the second embodiment will be described with reference to FIG. 21. Steps other than steps S2101 to S2104 in the figure are the same as those in FIG. 12 in the first embodiment, and thus the differences will be described below.

Figure 22:
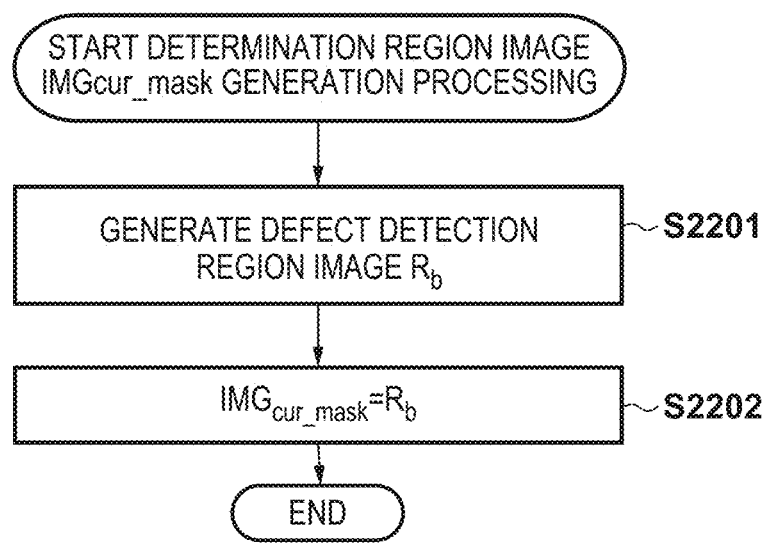
FIG. 22 is a flowchart of processing for generating a determination region image $IMG_{mask}$ of the second embodiment.
Figure 23:
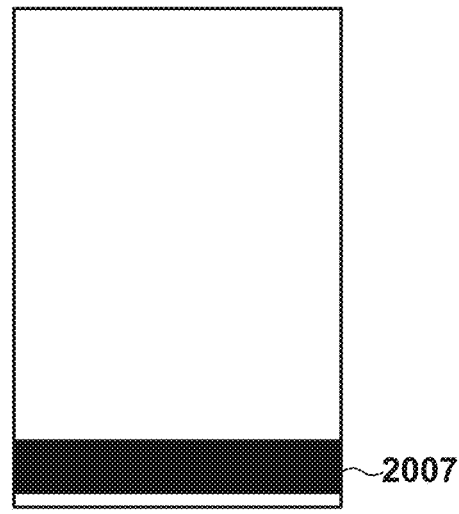
FIG. 23 is a diagram illustrating an example of a determination region image $IMG_{cur\_mask}$ of the second embodiment.

In step S2101, the reproducibility determination unit 306 generates an image $IMG_{cur\_mask}$ indicating a region for determining the reproducibility of the defect detected on the defect image. Details of processing for generating a determination region image will be described later with reference to FIG. 22. In the present embodiment, the reproducibility determination unit 306 generates an image in which the pixel region excluding the region 2007 that is the pixel region not reflected on the defect image $IMG_{def}$, in an image region on the $IMG_{cur}$ illustrated in FIG. 23, is used as the region for determining the reproducibility. In the determination region image, the region for determining the reproducibility is a binary image having a pixel value of "1", and the region 2007 for not determining the reproducibility is a binary image having a pixel value of "0".

Figure 24A:
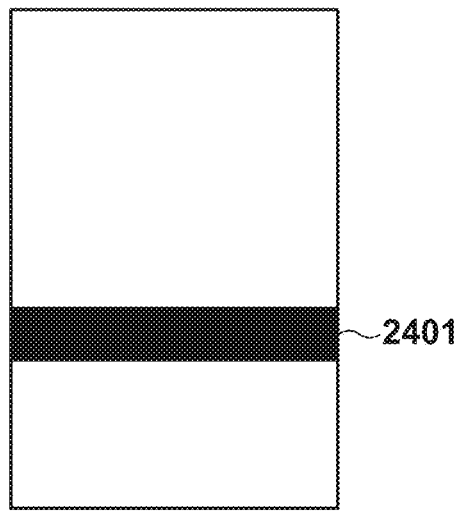
FIGS. 24A and 24B are diagrams illustrating examples of determination region images $IMG_{pre\_mask}$ and $IMG_{mask}$ of the second embodiment.
Figure 24B:
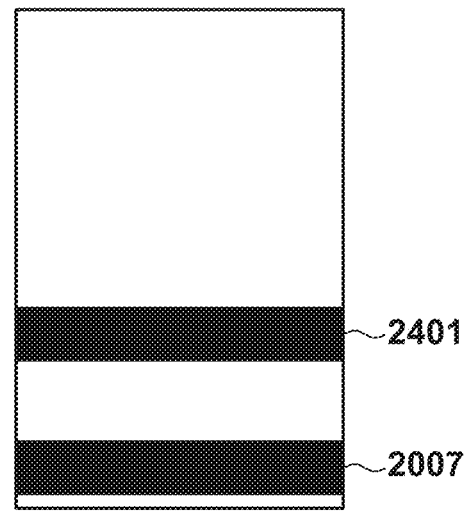
Figure 25A:
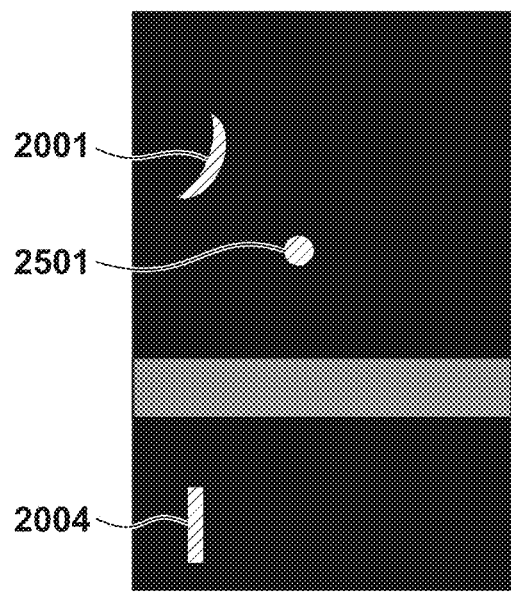
FIGS. 25A and 25B are diagrams illustrating an example of an image bearing member region image $IMG_{pre}$ and the determination result of the second embodiment.
Figure 25B:
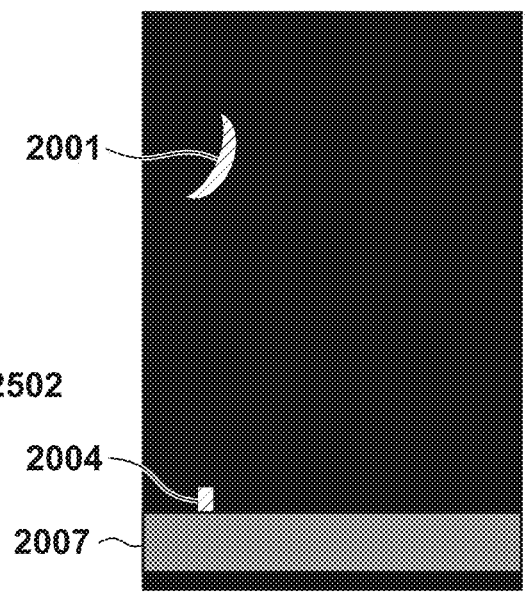

In step S2102, the reproducibility determination unit 306 generates a common region image $IMG_{mask}$ common to a reproducibility determination region image $IMG_{pre\_mask}$ on the image bearing member region image $IMG_{pre}$, which indicates the position of the defect already detected on the image bearing member region, and the $IMG_{cur\_mask}$ generated in step S2101. In the present embodiment, the $IMG_{pre\_mask}$ is an image in which the pixel region excluding a region 2401 illustrated in FIG. 24A is the region for determining the reproducibility. Therefore, the common region image $IMG_{mask}$ is a binary image in which the pixel region excluding the regions 2007 and 2401 illustrated in FIG. 24B is the region for determining the reproducibility. In the present embodiment, the image illustrated in FIG. 25A is stored in the RAM 102 or the main memory 104 as the image bearing member region image $IMG_{pre}$ indicating the position of the defect already detected on the image bearing member region. FIG. 25B is an image illustrating the position of the defect determined as the defect that is repeatedly reproduced by comparing the image $IMG_{cur}$ and the image $IMG_{pre}$. As in the first embodiment, the defect 2001 detected at the same position on the image bearing member region image is determined as the defect that is repeatedly reproduced. Further, by determining the reproducibility in the common region image $IMG_{mask}$ illustrated in FIG. 24B, it can be determined that the defect 2004 in which only a part of the region is detected in the image $IMG_{cur}$ is the defect that is repeatedly reproduced.

Figure 26:
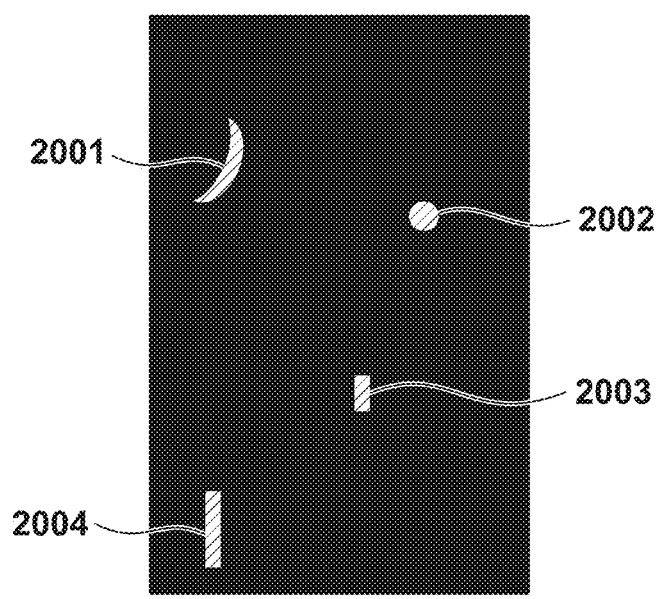
FIG. 26 is a diagram illustrating overwrite update processing of the image bearing member region image $IMG_{pre}$ of the second embodiment.

In step S2103, the reproducibility determination unit 306 overwrites and updates the pixel value of the image $IMG_{pre}$ with the pixel value of the image $IMG_{cur}$, in an $IMG_{cur\_mask}$ pixel region which is the region for determining the reproducibility by the image $IMG_{cur}$, among the pixel regions on the image $IMG_{pre}$. In the present embodiment, the image illustrated in FIG. 26 is generated by overwriting and updating the image $IMG_{pre}$ illustrated in FIG. 25A with the pixel value of the image $IMG_{cur}$ illustrated in FIG. 20D, in the $IMG_{cur\_mask}$ pixel region illustrated in FIG. 23. By this overwrite update, a defect 2501 randomly generated in the image $IMG_{pre}$ disappears, and the defect 2002 randomly generated in the image $IMG_{cur}$ is added. Further, a defect image in a pixel region of a region 2502 is added, and a defect 2003 is added.

In step S2104, the reproducibility determination unit 306 overwrites and updates as the image $IMG_{pre\_mask}$ the region obtained by taking a union of the region image $IMG_{pre\_mask}$ for determining the reproducibility and the image $IMG_{cur\_mask}$, and ends the processing.

Figure 27:
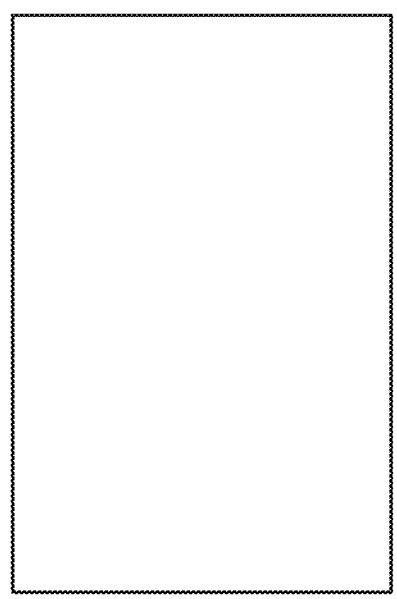
FIG. 27 is a diagram illustrating an example of an overwritten and updated determination region image $IMG_{pre\_mask}$ of the second embodiment.

In the present embodiment, the image $IMG_{pre\_mask}$ is an image whose entire surface is the region to be determined as illustrated in FIG. 27 by overwriting and updating the image $IMG_{pre\_mask}$ illustrated in FIG. 24A with a region obtained by taking the union with the image $IMG_{cur\_mask}$ illustrated in FIG. 23.

Flow of Generation Processing of Determination Region Image $IMG_{cur\_mask}$ in Step S2101

Next, the details of the generation processing of the determination region image in step S2101 will be described with reference to a flowchart of FIG. 22.

In step S2201, the reproducibility determination unit 306 generates a defect detection region image $R_b$ obtained by performing binarization processing on the image $IMG_{cur}$ illustrated in FIG. 20D with the pixel value "0" in a region of the pixel value=128 and the pixel value "1" in a region of the pixel value≠128. In the present embodiment, the image illustrated in FIG. 23, in which the pixel region other than the region 2007 is a defect detection region, is generated by the binarization processing.

In step S2202, the reproducibility determination unit 306 sets the image $R_b$ to the region image $IMG_{cur\_mask}$ for determining the reproducibility on the image $IMG_{cur}$, and ends the processing.

Figure 28:
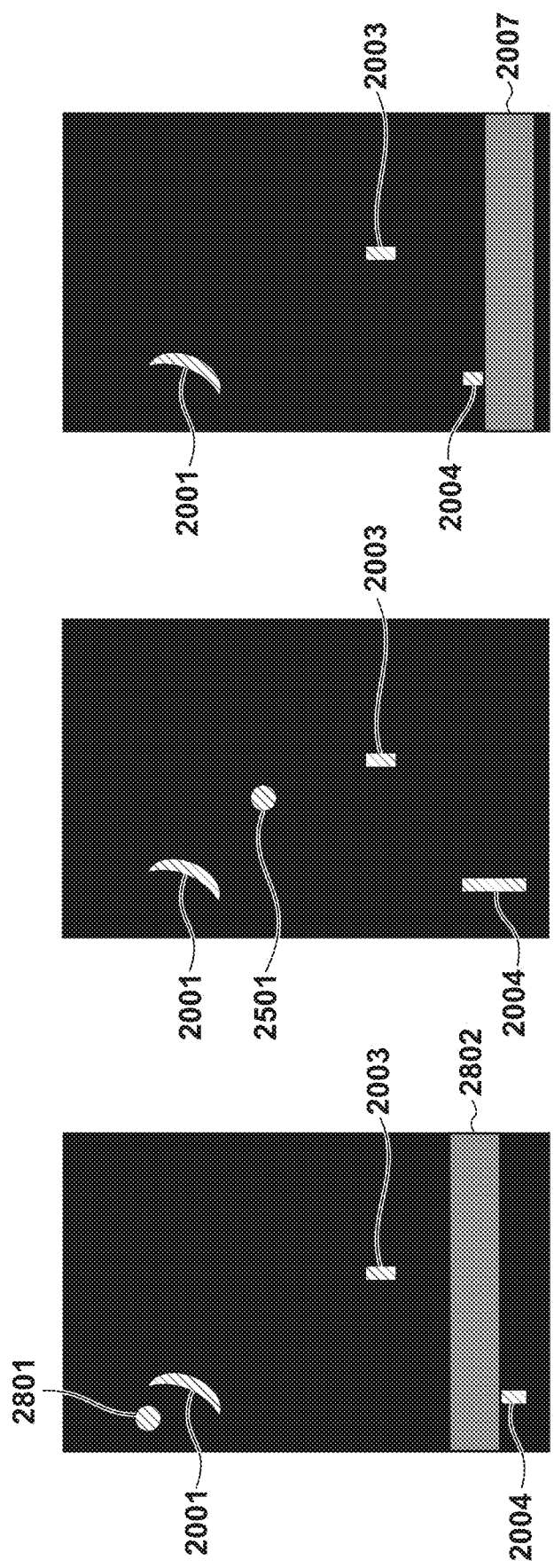
FIGS. 28A to 28C are diagrams illustrating the reproducibility determination processing for (i−1)th to (i+1)th scanned images of the second embodiment.

The above reproducibility determination processing is repeatedly performed for the first, second, ..., (i−1)th, i-th, and (i+1)th scanned images. Therefore, for example, in the (i−1)th scanned image, when the image illustrated in FIG. 28A is stored as the image $IMG_{pre}$, the image illustrated in FIG. 28B is generated as the image $IMG_{pre}$ by overwriting and updating the i-th scanned image. FIG. 28C is an image illustrating the pixel position of the defect determined to be the defect that is repeatedly reproduced in the present embodiment. The defect 2003, which is not reflected in the image bearing member region image in the i-th scanned image of FIG. 25A, is determined as the defect that is repeatedly reproduced.

By performing the image processing described above, even when the repeated defect caused by the scratch on the intermediate belt 194 having a period longer than the height of the defect image occurs, the reproducibility of the defect can be determined with high accuracy.

Modified Example (When Defect Position is Paper White Region, Excluded from Determination Region)

Figure 29:
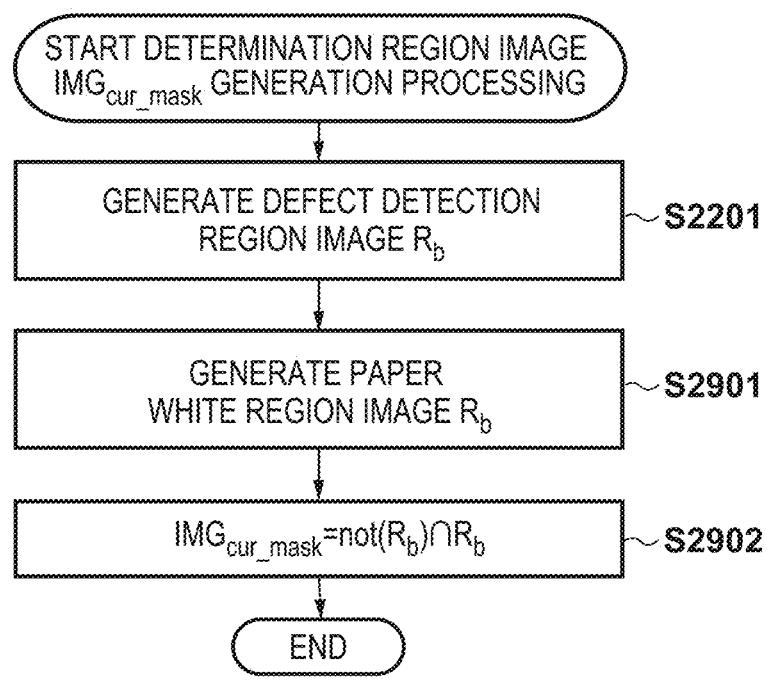
FIG. 29 is a flowchart of generation processing of the determination region image $IMG_{cur\_mask}$ of a modified example.

Hereinafter, a modified example of the generation processing of the determination region image in step S2101 will be described with reference to a flowchart of FIG. 29.

In the first and second embodiments, a determination is made regarding the presence/absence of reproducibility of a defect for an image in which a pictorial pattern is output on the entire surface of the image. However, color loss in which sufficient color material does not adhere due to the scratch or the like on the photosensitive drum 193 does not occur on the paper white region where the color material does not originally adhere, and thus when the output image includes the paper white region, the reproducibility of the defect due to color loss may be erroneously determined. Therefore, in this modified example, a method for determining the reproducibility of the defect with high accuracy even when the output image includes the paper white region by excluding the pixel region corresponding to the paper white region in the image bearing member region image from the determination region will be described.

Figures 30A, 30B, 30C:
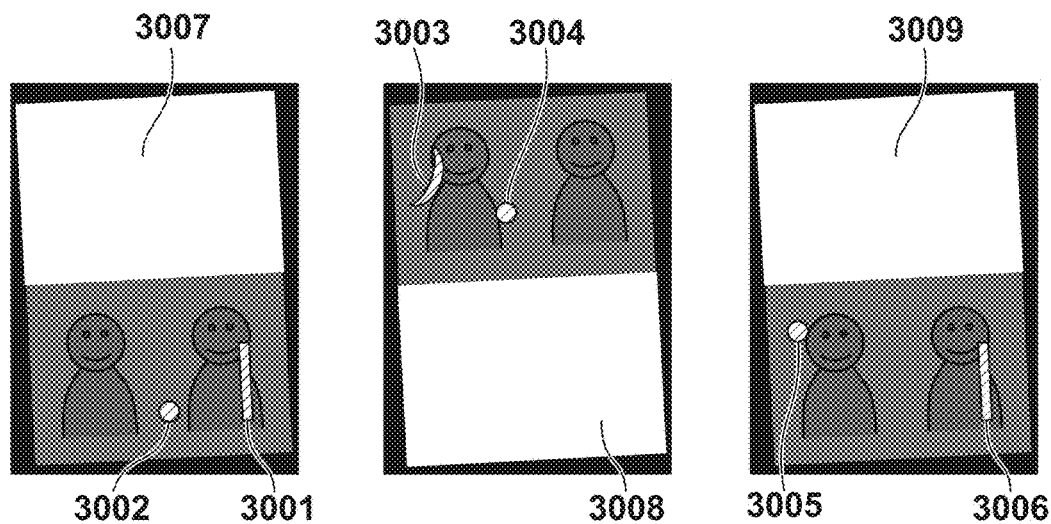
FIGS. 30A to 30I are diagrams illustrating an example of the scanned image, the defect image, and the image bearing member region image of the modified example.
Figures 30D, 30E, 30F:
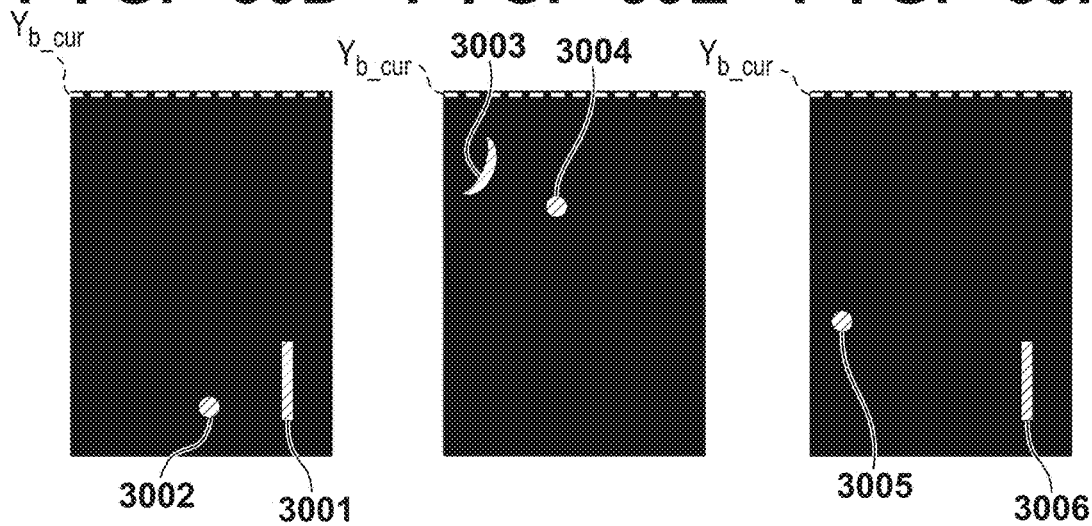
Figures 30G, 30H, 30I:
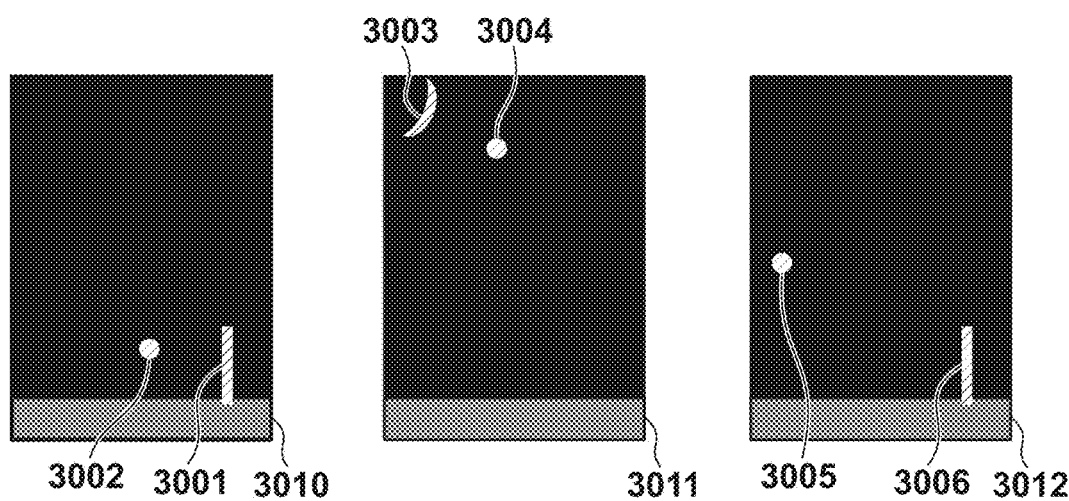

In this modified example, images illustrated in FIGS. 30A to 30C are received as the scanned images of the (i−1)th, i-th, and (i+1)th printed matters. The illustrated scanned images are examples in which the original printed matters are tilted counterclockwise due to the conveying position displacement. Then, it is illustrated that defects 3001 to 3006 are generated on the scanned image. Further, regions 3007 to 3009 are paper white regions on the (i−1)th to (i+1)th scanned images. Defect images illustrated in FIGS. 30D to 30F are generated by taking the difference between the scanned image after undergoing correction processing and the reference image, and the pixel regions of the defects 3001 to 3006 are detected as the defect regions. Further, the image bearing member region image illustrated in FIGS. 30G to 30I are generated on the basis of the pixel position $Y_{b\_cur}$ corresponding to the start position of the intermediate belt 194 of FIGS. 30D to 30F. Regions 3010 to 3012 in FIGS. 30G to 30I are the image regions that are not reflected on the defect image, and are the image regions having a pixel value of 128.

Flow of Generation Processing of Determination Region Image $IMG_{cur\_mask}$ in Step S2101

Hereinafter, a modified example of the generation processing of the determination region image $IMG_{cur\_mask}$ in step S2101 will be described with reference to the flowchart of FIG. 29.

Since a flow of the generation processing of the determination region image $IMG_{cur\_mask}$ in step S2101 of this modified example is the same as that described with reference to FIG. 22 except for steps S2901 and S2902, description thereof will be omitted.

In step S2901, the reproducibility determination unit 306 generates the paper white region image by performing binarization processing on the scanned image at the threshold $I_p$. The threshold $I_p$ is a threshold for detecting the paper white region, and in the present embodiment, $I_p$=250. In the present embodiment, the scanned image illustrated in FIGS. 30A to 30C is subjected to the binarization processing at the threshold $I_p$, to generate binarized images illustrated in FIGS. 31A to 31C. The paper white regions 3007 to 3009 are binarized images having a pixel value of 255, and other pictorial pattern regions are binarized images having a pixel value of 0. Subsequently, the reproducibility determination unit 306 performs geometric transformation using the affine transformation matrix calculated in the correction processing in step S404, and generates an image trimmed in the reference image region. Further, the reproducibility determination unit 306 generates the image bearing member region image on the basis of the pixel position $Y_{b\_cur}$ corresponding to the start position of the intermediate belt 194. In the present embodiment, the image bearing member region image illustrated in FIGS. 31D to 31F and having a pixel value of 255 in the regions 3007 to 3009 and a pixel value of 128 in the regions 3010 to 3012 is generated. A paper white region image $R_p$ is generated by performing binarization processing on the image bearing member region image with the pixel value "0" in a region of the pixel value=255 and the pixel value "1" in a region of the pixel value≠255. In the present embodiment, the paper white region image $R_p$ is the binary image illustrated in FIGS. 31G to 31I and having a pixel value of "1" in the regions 3007 to 3009 and a pixel value of "0" in other regions.

In step S2902, the reproducibility determination unit 306 generates an image not ($R_p$) in which the binarized image of the paper white region image $R_p$ is gradation inverted, and a common region image (logical product image) of the defect detection region image $R_b$. The reproducibility determination unit 306 sets the generated common region image to the region image $IMG_{cur\_mask}$ for determining the reproducibility on the image $IMG_{cur}$, and ends the processing. In the present embodiment, the binary image having the pixel value 1 in the regions 3101 to 3103 illustrated in FIGS. 31J to 31L is generated as the determination region image $IMG_{cur\_mask}$.

Figure 32A:
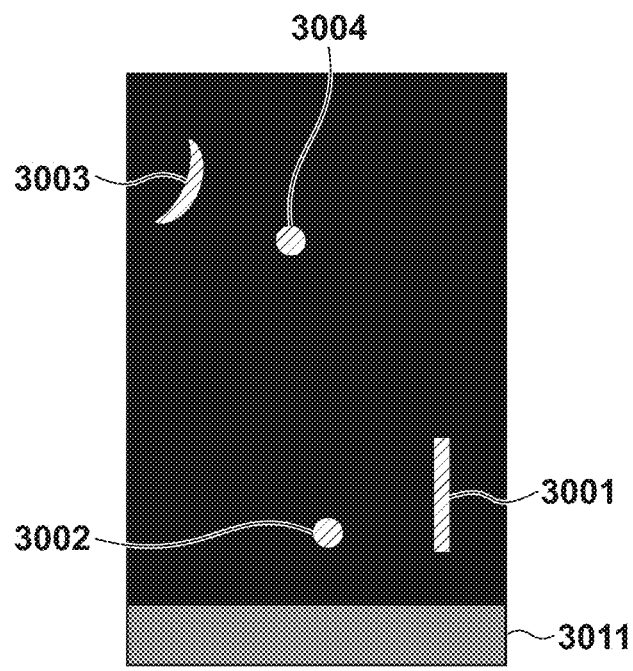
FIGS. 32A and 32B are diagrams illustrating an example of the image bearing member region image $IMG_{pre}$ and the determination result of the modified example.
Figure 32B:
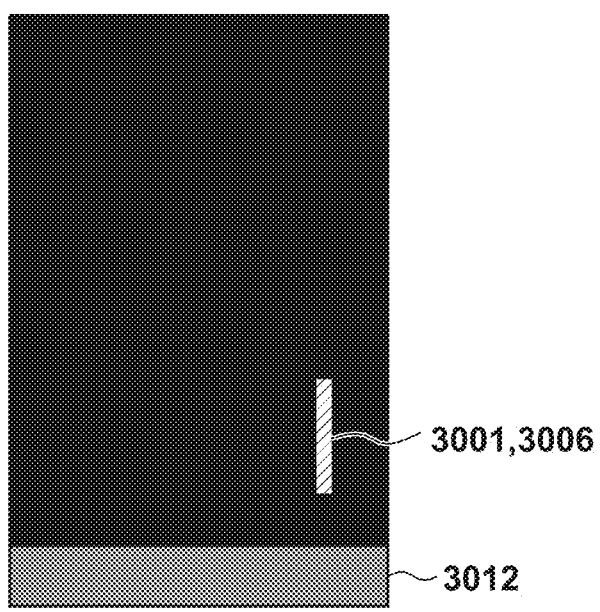

The above reproducibility determination processing is performed for the (i−1)th, i-th, and (i+1)th scanned images. In the (i−1)th and i-th scanned images, when images illustrated in FIGS. 30G and 30H are stored as the image $IMG_{pre}$ and images illustrated in FIGS. 31J and 31K are stored as the determination region image $IMG_{cur\_mask}$, the image illustrated in FIG. 32A is generated as the image $IMG_{pre}$ by overwriting and updating the i-th scanned image. As a result, as illustrated in FIG. 32B, it is determined that the defect 3001 (3006) that does not occur on the paper white region of the image bearing member region image in the i-th scan image is the defect that is repeatedly reproduced in the (i+1)th scanned image.

By performing the image processing described above, even when the output image includes the paper white region, the reproducibility of the defect due to color loss can be determined with high accuracy.

Third Embodiment

In the first and second embodiments, a determination is made regarding the presence/absence of reproducibility of a defect caused by a scratch on an image bearing member, such as the photosensitive drum 193 and the intermediate belt 194. However, when a sensor defect occurs, it may be erroneously determined that the defect is repeatedly reproduced on the scanned image even though the actual output image itself has no defect. Therefore, in the third embodiment, a method for discriminating the defect caused by the scratch on the image bearing member from the sensor defect and performing different processing will be described. Specifically, as an example of another processing, when the sensor defect is detected, the output image itself has no defect, and thus processing to ignore the sensor defect and output the image or processing to display the sensor defect error on the UI to warn the user may be performed.

Figure 33A:
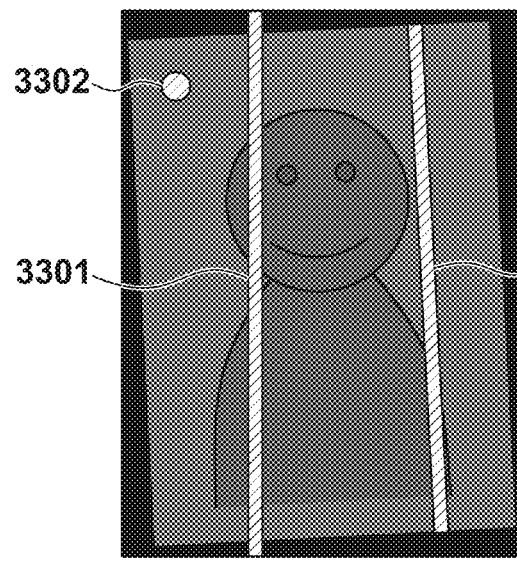
FIGS. 33A to 33D are diagrams illustrating an example of the scanned image and the defect image of a third embodiment.
Figure 33B:
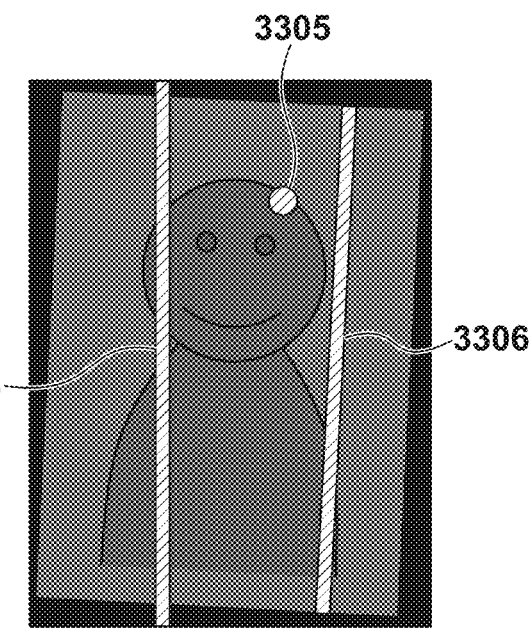

In the present embodiment, images illustrated in FIGS. 33A and 33B are received as the i-th and (i+1)th scanned images. In the illustrated images, the printed matters on the i-th and (i+1)th scanned images are tilted respectively counterclockwise and clockwise due to the conveying position displacement. On the scanned image, linear defects 3301 and 3304 caused by the sensor defect are reflected across upper and lower ends of the scanned image. Further, linear defects 3303 and 3306 caused by the scratch on the intermediate belt 194 are reflected across upper and lower ends of the paper surface. In addition, randomly generated defects 3302 and 3305 are reflected.

Figure 33C:
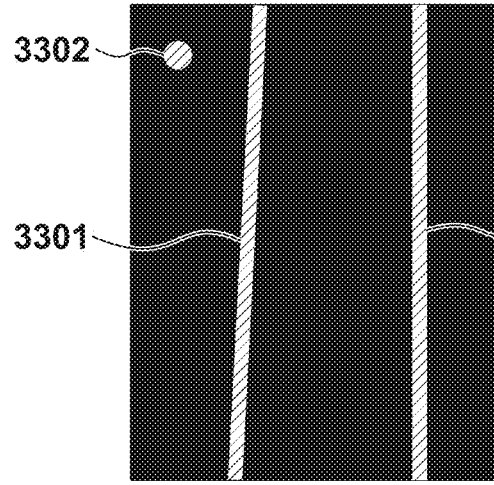
Figure 33D:
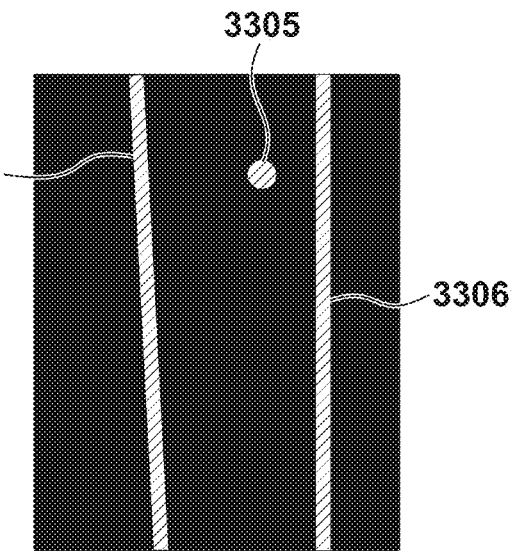

Defect images illustrated in FIGS. 33C and 33D are generated by taking the difference between the scanned image after undergoing correction processing and the reference image, and the pixel regions of defects 3301 to 3306 are detected as the defect regions.

Operation of Reproducibility Determination Unit 306

Figure 34:
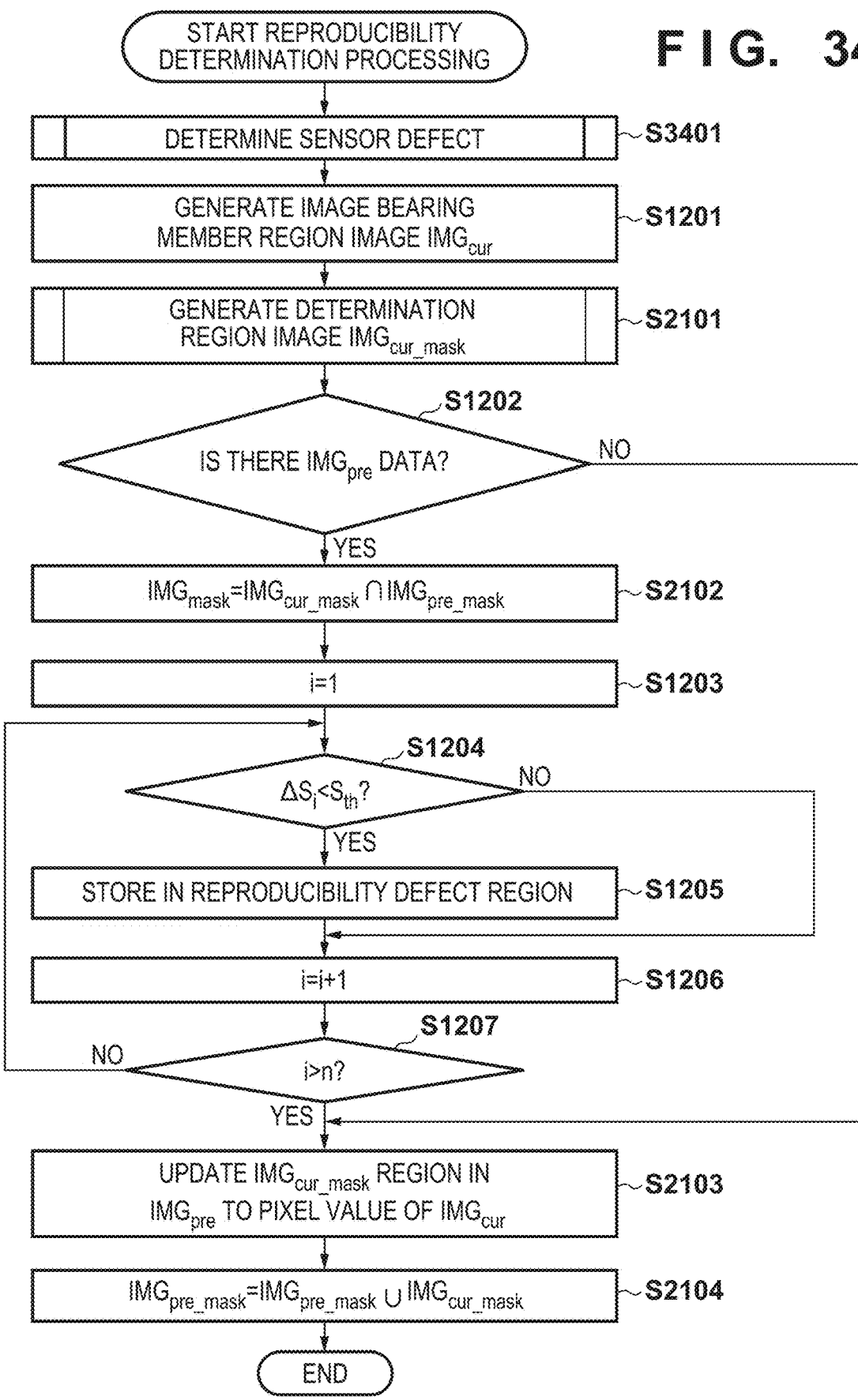
FIG. 34 is a flowchart of the reproducibility determination processing of the third embodiment.

The flow of the reproducibility determination processing of the third embodiment is the same as that described with reference to FIGS. 12 and 21 in the first and second embodiments except for step S3401. Hereinafter, the reproducibility determination processing in the third embodiment will be described with reference to FIG. 34.

Figure 35:
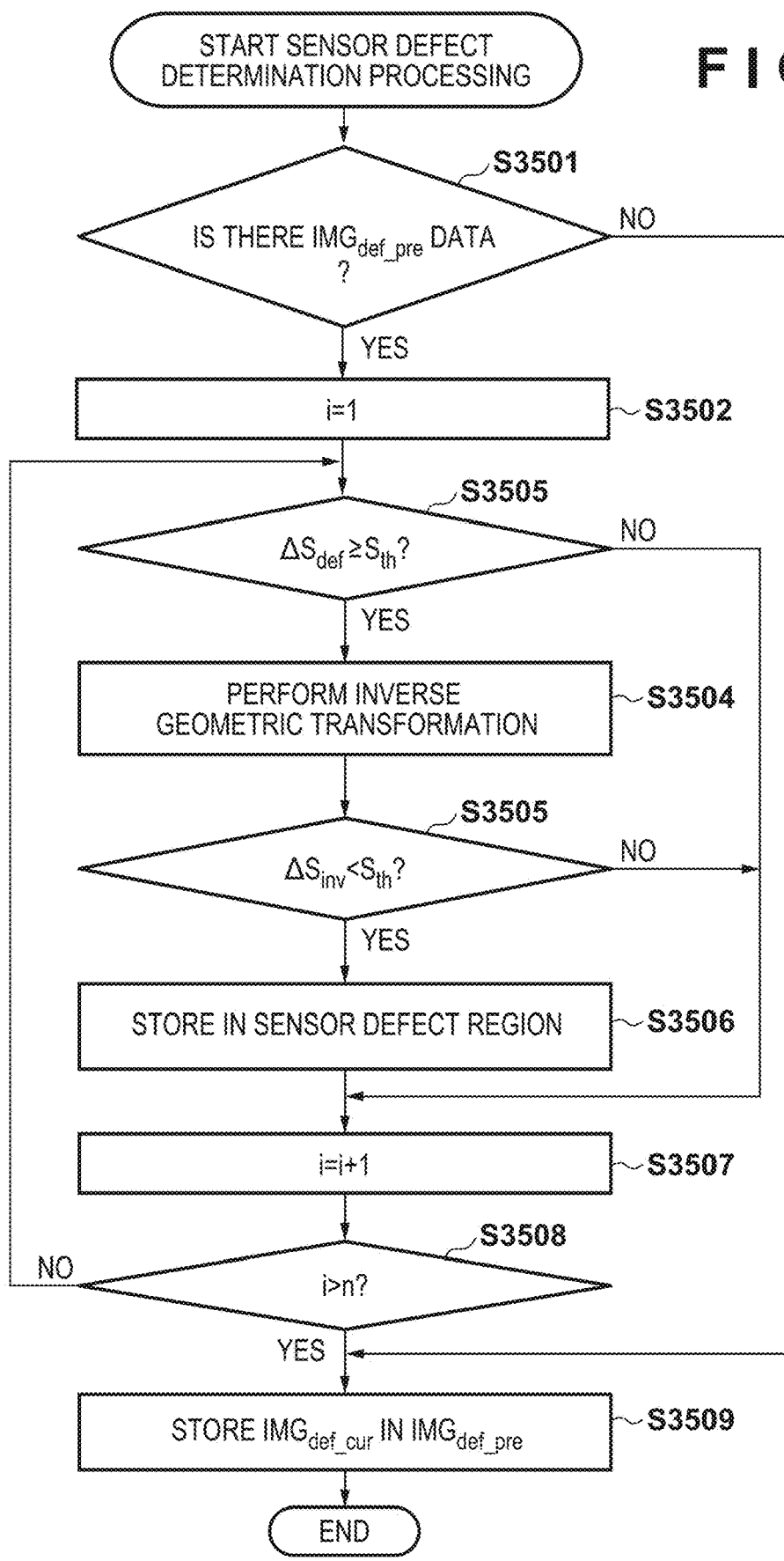
FIG. 35 is a flowchart of sensor defect determination processing of the third embodiment.
Figure 36:
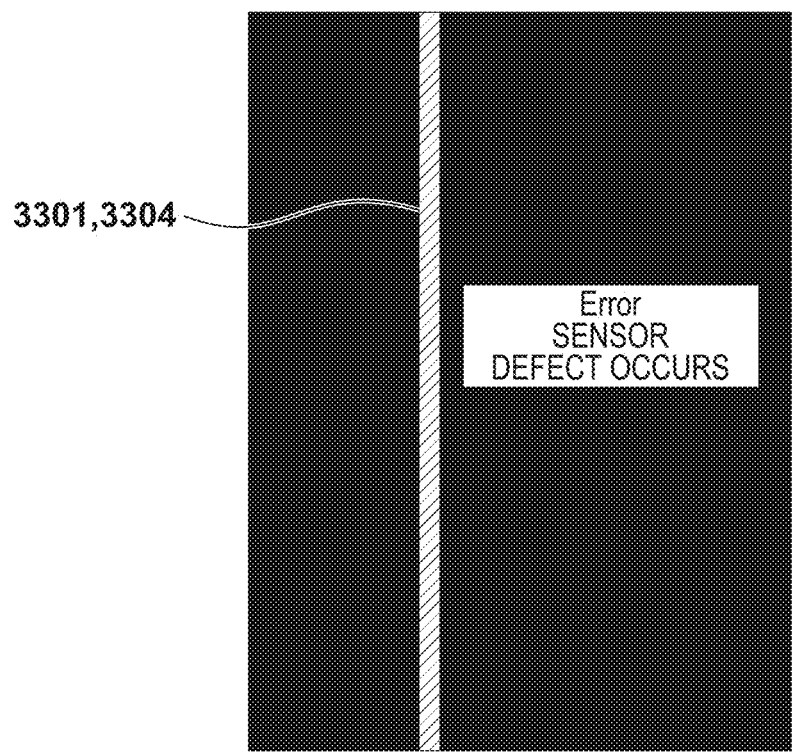
FIG. 36 is a diagram illustrating an example of the determination result of the third embodiment.

In step S3401, the reproducibility determination unit 306 determines whether the detected defect is a defect caused by the sensor defect by comparing the defect images corresponding to the i-th and (i+1)th scan images. Details of sensor defect determination processing will be described later with reference to FIG. 35. In the present embodiment, the defect image illustrated in FIG. 36 is generated by comparing the i-th and (i+1)th defect images, and the pixel region of the defect 3301 (3304) is detected as the sensor defect.

Flow of Sensor Defect Determination Processing in Step S3401

Hereinafter, the details of the sensor defect determination processing in step S3401 will be described with reference to a flowchart of FIG. 35.

In step S3501, the reproducibility determination unit 306 determines whether or not a defect image $IMG_{def\_pre}$ indicating the position of the already detected defect on the reference image is stored in the RAM 102 or the main memory 104. If the $IMG_{def\_pre}$ is stored, the reproducibility determination unit 306 determines that it is possible to determine whether there is the sensor defect on the scanned image $IMG_{scan}$, and shifts the processing to step S3502. Further, if the defect image $IMG_{def\_pre}$ is not stored, the reproducibility determination unit 306 determines that it is not possible to determine whether there is the sensor defect, and shifts the processing to step S3509. In the present embodiment, the defect image $IMG_{def\_pre}$ illustrated in FIG. 33C is generated, and the defects 3301 to 3303 are detected.

In step S3502, the reproducibility determination unit 306 initializes the variable i indicating the defect region number with "1". In step S3503, the reproducibility determination unit 306 determines whether an amount $\Delta S_{def}$ of position displacement of the defect region i on the defect image satisfies $\Delta S_{def} \geq S_{th}$ according to the following equation (4).

$$\Delta S_{def} = \frac{\sum_{(x,y) \in S_i} |IMG_{def\_cur}(x, y) - IMG_{def\_pre}(x, y)|}{S_i} \geq S_{th} \qquad (4)$$

Figure 37A:
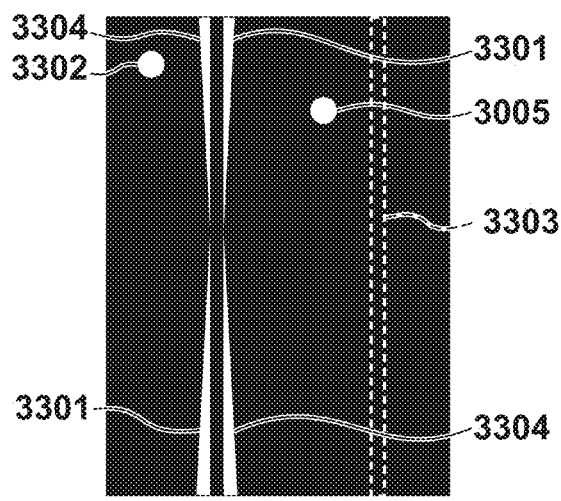
FIGS. 37A to 37D are diagrams illustrating the sensor defect determination processing of the third embodiment.

Here, $S_{th}$ is the threshold for determining the reproducibility of the defect region, and $S_{th}=0.1$ in the present embodiment. If $\Delta S_{def} \geq S_{th}$ is satisfied, the reproducibility determination unit 306 determines that the defect region i is the sensor defect or the randomly generated defect, and shifts the processing to step S3504. Further, if $\Delta S_{def} \geq S_{th}$ is not satisfied, the reproducibility determination unit 306 determines that the defect region i is the defect that is repeatedly reproduced due to the scratch on the image bearing member, and shifts the processing to step S3507. In the present embodiment, a defect image $IMG_{def\_cur}$ illustrated in FIG. 33D is generated, and the defects 3304 to 3306 are detected. The image illustrated in FIG. 37A is generated by taking an absolute value of a difference between the defect image $IMG_{def\_pre}$ illustrated in FIG. 33C and the defect image $IMG_{def\_cur}$ illustrated in FIG. 33D. The defects 3301, 3302, 3304, and 3305 are determined to be the sensor defects or the randomly generated defects, and the defect 3303 (3306) is determined to be the defect that is repeatedly reproduced due to the scratch on the image bearing member.

Figure 37B:
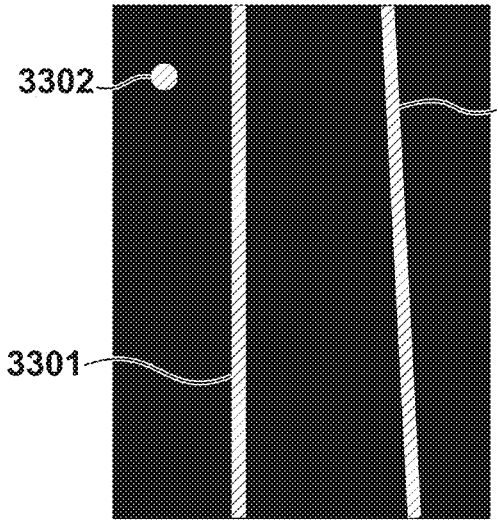
Figure 37C:
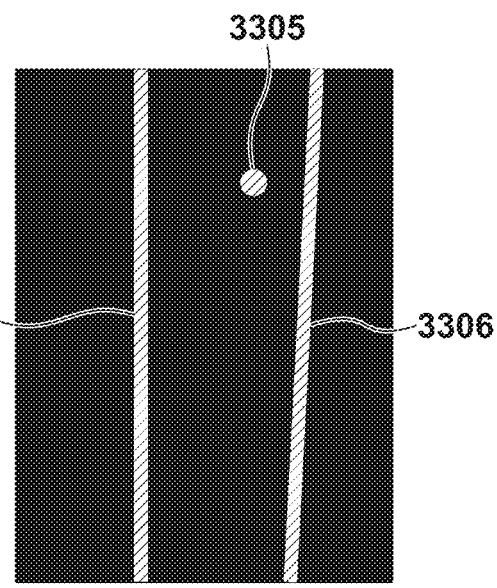

In step S3504, the reproducibility determination unit 306 generates images $IMG_{inv\_pre}$ and $IMG_{inv\_cur}$ obtained by performing inverse geometric transformation on the defect images $IMG_{def\_pre}$ and $IMG_{def\_cur}$ using an inverse matrix of the affine transformation matrix calculated by the correction processing in step S404. In the present embodiment, the images $IMG_{inv\_pre}$ and $IMG_{inv\_cur}$ illustrated in FIGS. 37B and 37C are generated by performing inverse geometric transformation on the defect images $IMG_{def\_pre}$ and $IMG_{def\_cur}$ illustrated in FIGS. 33C and 33D. In the defects 3001 and 3004 caused by the sensor defect, the defects are detected on a straight line of the pixel position $x=x_0$ in the x direction. Since the defects 3302 and 3305 are the randomly generated defects, the defects are detected on different pixel regions. Further, in the defects 3003 and 3006, the defects are detected on different pixel regions due to the conveying position displacement of the printed matter. In step S3505, the reproducibility determination unit 306 determines whether an amount $\Delta S_{inv}$ of position displacement of the defect region i on the defect image subjected to the inverse geometric transformation satisfies $\Delta S_{inv} < S_{th}$ according to the following equation (5).

$$\Delta S_{inv} = \frac{\sum_{(x,y) \in S_i} |IMG_{inv\_cur}(x, y) - IMG_{inv\_pre}(x, y)|}{S_i} < S_{th} \qquad (5)$$

Figure 37D:
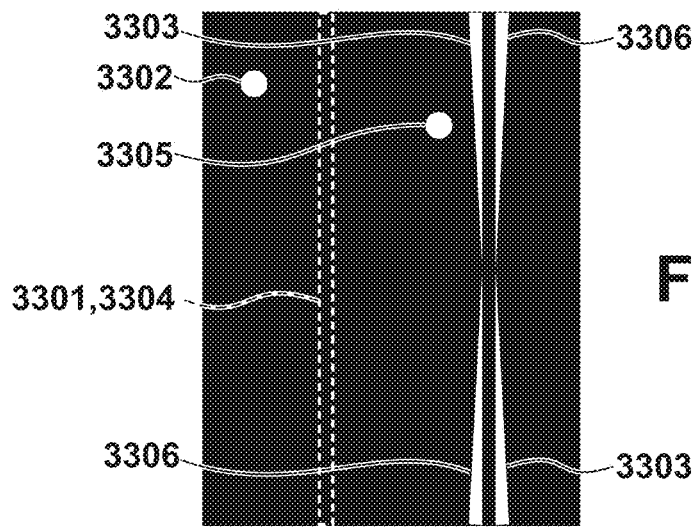

Here, $S_{th}$ is the threshold for determining the reproducibility of the defect region, and $S_{th}=0.1$ in the present embodiment. If $\Delta S_{inv} < S_{th}$ is satisfied, the reproducibility determination unit 306 determines that the defect region i is the sensor defect, and shifts the processing to step S3506. If $\Delta S_{inv} < S_{th}$ is not satisfied, the reproducibility determination unit 306 determines that the defect region i is the randomly generated defect, and shifts the processing to step S3507. In the present embodiment, the image illustrated in FIG. 37D is generated by taking an absolute value of a difference between the defect image $IMG_{inv\_pre}$ subjected to the inverse geometric transformation and the $IMG_{inv\_cur}$. In the image of FIG. 37D, the defect 3001 (3304) is determined to be the sensor defect, and the defects 3302 and 3305 are determined to be the randomly generated defects.

In step S3506, the reproducibility determination unit 306 stores the defect area i as the sensor defect region in the RAM 102 or the main memory 104.

In step S3507, the reproducibility determination unit 306 updates the variable i indicating the defect region by incrementing the variable i by "1". In step S3508, the reproducibility determination unit 306 determines whether the defect region number i satisfies i>n. If i>n is satisfied, it is determined that the sensor defect determination processing has been performed on all the defect regions, and the processing is shifted to step S3509. Further, if i>n is not satisfied, the reproducibility determination unit 306 returns the processing to step S3503. In step S3509, the reproducibility determination unit 306 stores the $IMG_{def\_cur}$ as the defect image $IMG_{def\_pre}$ indicating the position of the already detected defect on the reference image in the RAM 102 or the main memory 104, and ends this processing.

FIG. 36 is an image illustrating the pixel position of the defect determined to be the sensor defect by the sensor defect determination processing of the present embodiment. In the present embodiment, the defect 3001 (3004) is determined to be the sensor defect, and the sensor defect error is displayed on the UI to warn the user.

By performing the image processing described above, even when the defect is repeatedly detected on the scanned image due to the sensor defect, it is possible to discriminate the defect caused by the scratch on the image bearing member from the sensor defect and perform different processing.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-066715, which was filed on Apr. 9, 2021 and which is hereby incorporated by reference herein in its entirety.

What is claimed is:

1. An image processing apparatus that is to be connected to a printing apparatus, that sequentially receives a plurality of recording media on which printing was performed by the printing apparatus, and that inspects a quality of images formed on the recording media, the image processing apparatus comprising:
   a processor; and
   a memory storing instructions to be executed by the processor, wherein the instructions, when executed by the processor, cause the image processing apparatus to function as:
   a reference image reception unit configured to receive a reference image;
   a scanned image reception unit configured to acquire a plurality of scanned images by sequentially scanning the recording media output from the printing apparatus and having the images to be inspected recorded thereon;
   a phase information reception unit configured to receive phase information of an image bearing member of the printing apparatus;
   a defect detection unit configured to, for each of the scanned images, detect a defect on the scanned image by comparing a pixel value of the reference image and a pixel value of the scanned image; and
   a determination unit configured to determine whether a defect has reproducibility based on positions of defects on the recording media calculated from the phase information.

2. The apparatus according to claim 1,
   wherein the image bearing member of the printing apparatus includes a photosensitive drum that employs an electrophotographic recording method, an intermediate transfer belt configured to transfer a toner image formed on the photosensitive drum, and a transfer roller configured to transfer a toner image on the intermediate transfer belt onto a recording medium, and
   the phase information is information that is obtained by the printing apparatus synchronizing with the image processing apparatus by communication with the printing apparatus, and associates a rotational phase of the image bearing member with a scanning pixel position of a scanner of the scanned image reception unit.

3. The apparatus according to claim 1, wherein the determination unit masks a region on the image bearing member corresponding to a pixel region of the scanned images as a region for determining whether the defect has reproducibility.

4. The apparatus according to claim 1, wherein the determination unit excludes a region on the image bearing member corresponding to a paper white region of the reference image from a region for determining whether the defect has reproducibility.

5. The apparatus according to claim 1, wherein if defect position displacement between the scanned images aligned with the reference image is larger than a predetermined threshold, and defect position displacement between the scanned images not aligned with the reference image is smaller than a predetermined threshold, the determination unit determines that the defect is a defect of a sensor that acquires the scanned images of the scanned image reception unit.

6. The apparatus according to claim 1, wherein the scanned image reception unit includes a correction unit configured to correct an image obtained by scanning, according to position displacement due to conveyance of the recording medium on which the image is recorded.

7. A method of controlling an image processing apparatus that is to be connected to a printing apparatus, that sequentially receives a plurality of recording media on which printing was performed by the printing apparatus, and that inspects a quality of images formed on the recording media, the method comprising:
   (a) receiving a reference image;
   (b) acquiring a plurality of scanned images by sequentially scanning the recording media output from the printing apparatus and having the images to be inspected recorded thereon;
   (c) receiving phase information of an image bearing member of the printing apparatus;
   (d) for each of the scanned images, detecting a defect on the scanned image by comparing a pixel value of the reference image and a pixel value of the scanned image; and
   (e) determining whether a defect has reproducibility based on positions of defects on the recording media calculated from the phase information.

8. A non-transitory computer-readable storage medium storing a program which, when read and executed by a computer, causes the computer to execute the steps of a method of controlling an image processing apparatus that is to be connected to a printing apparatus, that sequentially receives a plurality of recording media on which printing was performed by the printing apparatus, and that inspects a quality of images formed on the recording media, the method comprising:
   (a) receiving a reference image;
   (b) acquiring a plurality of scanned images by sequentially scanning the recording media output from the printing apparatus and having the images to be inspected recorded thereon;

(c) receiving phase information of an image bearing member of the printing apparatus;

(d) for each of the scanned images, detecting a defect on the scanned image by comparing a pixel value of the reference image and a pixel value of the scanned image; and (e) determining whether a defect has reproducibility based on positions of defects on the recording media calculated from the phase information.

* * * * *